(12) United States Patent
Gentner

(10) Patent No.: US 11,813,907 B2
(45) Date of Patent: Nov. 14, 2023

(54) TRAILER HITCH

(71) Applicant: ACPS Automotive GmbH, Ingersheim (DE)

(72) Inventor: Wolfgang Gentner, Steinheim (DE)

(73) Assignee: ACPS Automotive GmbH, Ingersheim (DE)

( * ) Notice: Subject to any disclaimer, the term of this patent is extended or adjusted under 35 U.S.C. 154(b) by 184 days.

(21) Appl. No.: 17/238,422

(22) Filed: Apr. 23, 2021

(65) Prior Publication Data

US 2021/0331539 A1    Oct. 28, 2021

(30) Foreign Application Priority Data

Apr. 27, 2020   (DE) .......................... 102020111469.9

(51) Int. Cl.
*B60D 1/54* (2006.01)
*B60D 1/24* (2006.01)

(52) U.S. Cl.
CPC ............... *B60D 1/54* (2013.01); *B60D 1/246* (2013.01)

(58) Field of Classification Search
CPC .................................. B60D 1/54; B60D 1/246
See application file for complete search history.

(56) References Cited

U.S. PATENT DOCUMENTS 7,699,335 B2    4/2010   Riehle et al.
10,189,323 B2 *  1/2019   Kadnikov ............... B60D 1/54
(Continued)

FOREIGN PATENT DOCUMENTS

DE   102005032474 A1   1/2007
DE   102013007114 A1   10/2014
(Continued)

*Primary Examiner* — Kevin Hurley
(74) *Attorney, Agent, or Firm* — Reinhart Boerner Van Deuren P.C.

(57) ABSTRACT

In order, in the case of a trailer hitch, comprising a ball neck, which is movable between a working position and a rest position and has a pivot bearing body arranged at a first end and a coupling ball arranged at a second end, a pivot bearing unit, which is arranged fixed to a vehicle and by means of which the pivot bearing body is received such that it is pivotal for the purpose of performing a pivotal movement about a pivot axis between the working position and the rest position, and a rotation-blocking device that is active between the pivot bearing unit and the pivot bearing body, to achieve fixing of the rotation-blocking device in the release position in the simplest possible manner, it is proposed that there run between receptacles in the rotation-blocking device blocking faces against which the rotation-blocking bodies of the rotation-blocking device are configured to abut and from which the receptacles extend, that rotation-blocking units of the rotation-blocking device and the receptacles are arranged at angular spacings from one another around the pivot axis such that, in all the pivotal positions of the pivot bearing body that are provided, including the rest position and with the exception of the working position, the rotation-blocking body of at least one of the rotation blocking units lies opposite one of the blocking faces, and thus this blocking face blocks movement of the actuation body in the actuation direction.

57 Claims, 25 Drawing Sheets

(56) References Cited

U.S. PATENT DOCUMENTS

| | | |
|---|---|---|
| 10,780,753 B2 | 9/2020 | Recker et al. |
| 2007/0007749 A1 | 1/2007 | Gentner et al. |
| 2017/0072753 A1 | 3/2017 | Kadnikov et al. |
| 2018/0222265 A1 | 8/2018 | Recker et al. |
| 2021/0129609 A1* | 5/2021 | Gentner .................. B60D 1/54 |
| 2021/0331538 A1 | 10/2021 | Kato |
| 2021/0331540 A1 | 10/2021 | Gentner |
| 2021/0354520 A1 | 11/2021 | Angermann et al. |

FOREIGN PATENT DOCUMENTS

| | | |
|---|---|---|
| DE | 102014011348 A1 | 2/2015 |
| DE | 102015115357 A1 | 3/2017 |
| DE | 102017102505 A1 | 8/2018 |
| DE | 102018124518 A1 | 4/2020 |
| WO | 2020/069936 A2 | 4/2020 |

\* cited by examiner

FIG.20
FIG.20a
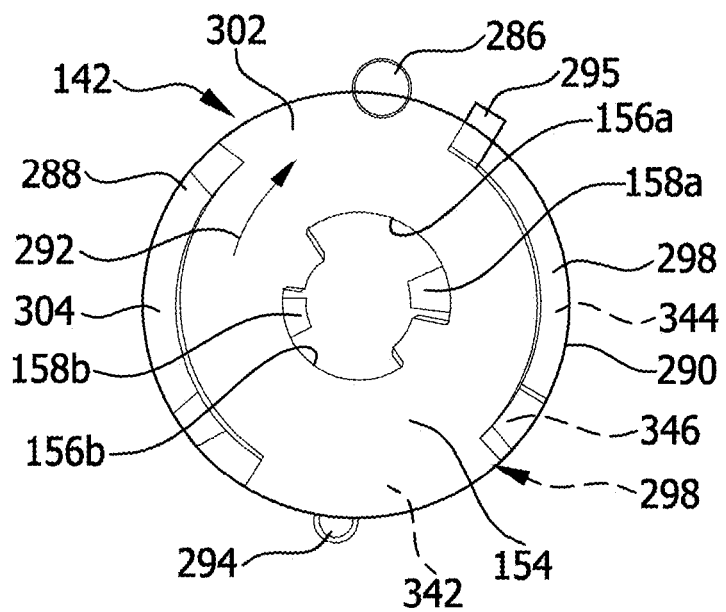
FIG.20c
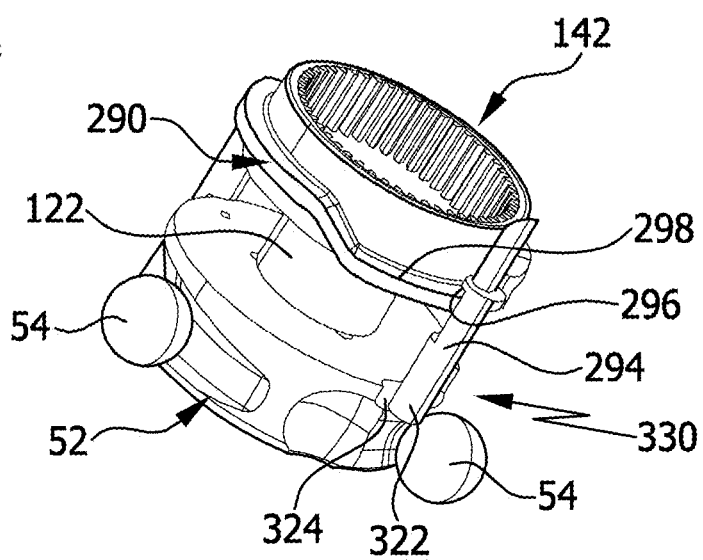
FIG.20b
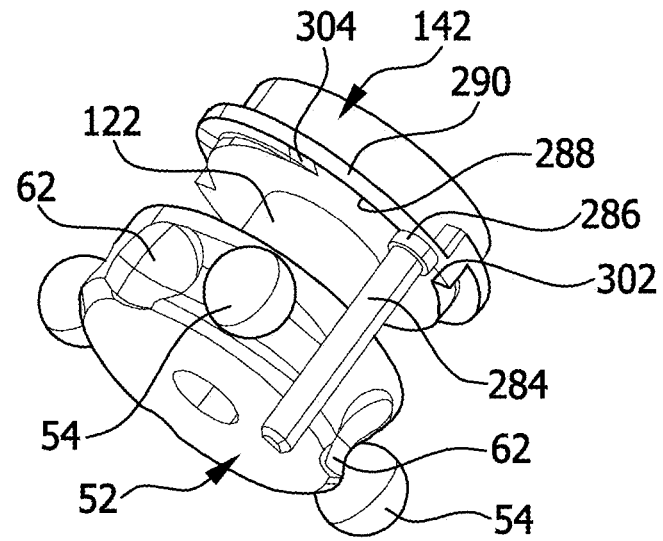

FIG.21
FIG.21a
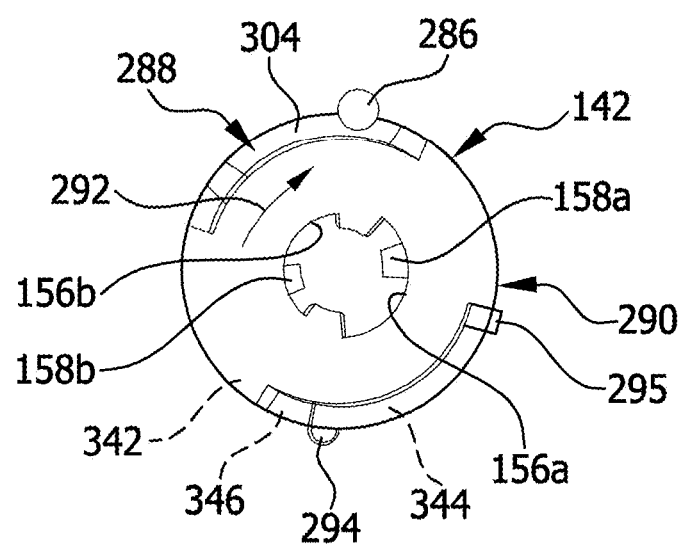
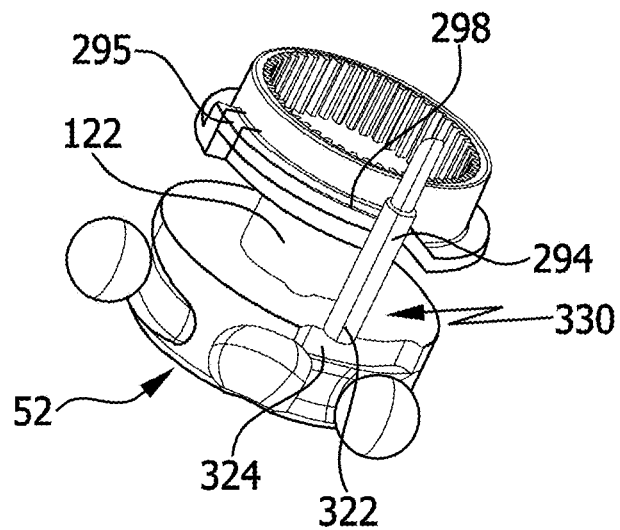
FIG.21c
FIG.21b
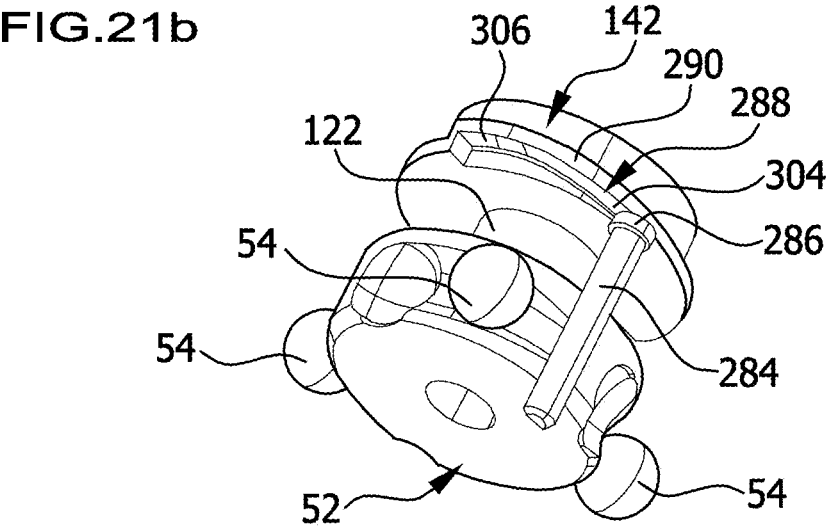

FIG.22
FIG.22a
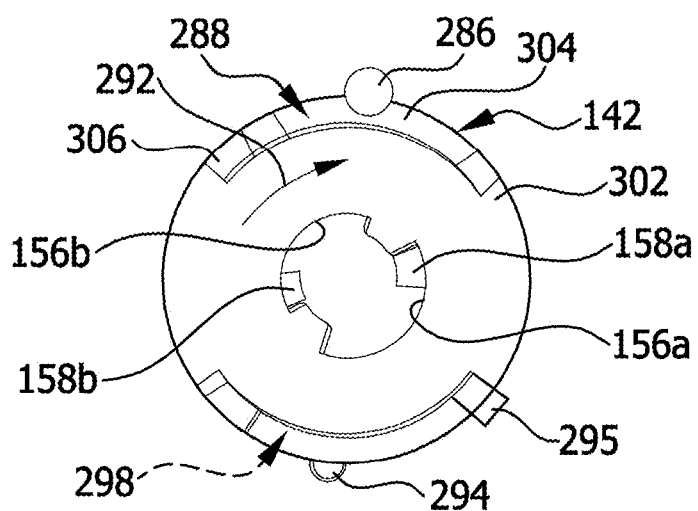
FIG.22c
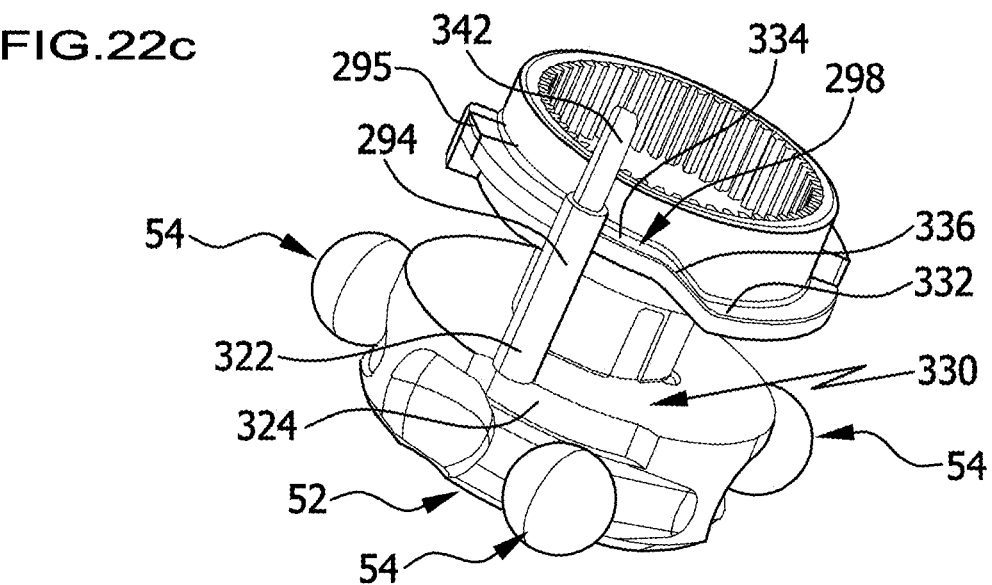
FIG.22b
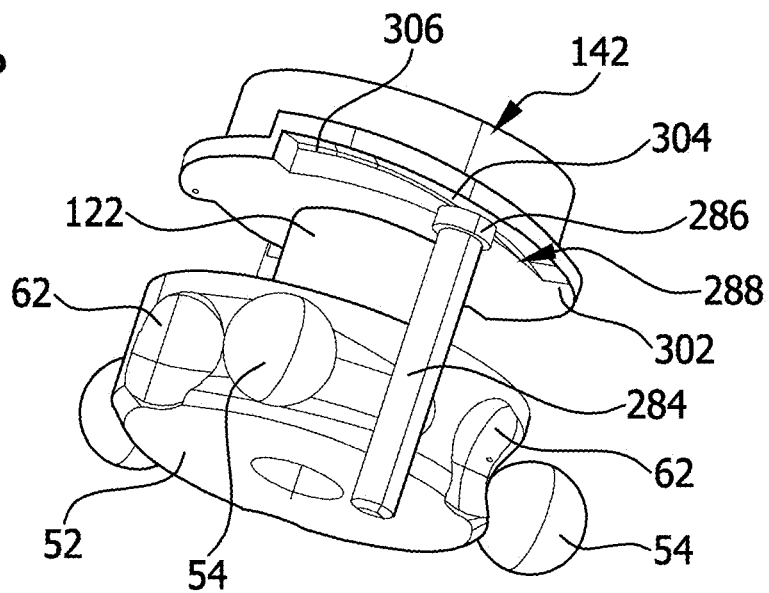

FIG.23
FIG.23a
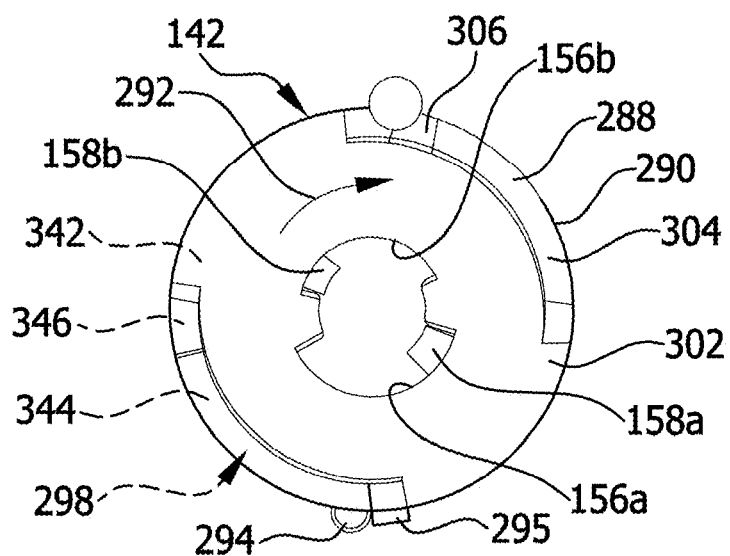
FIG.23c
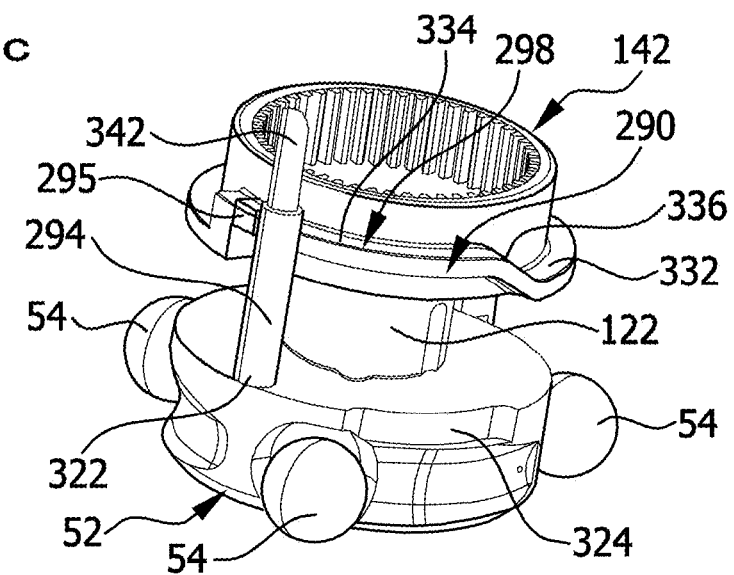
FIG.23b
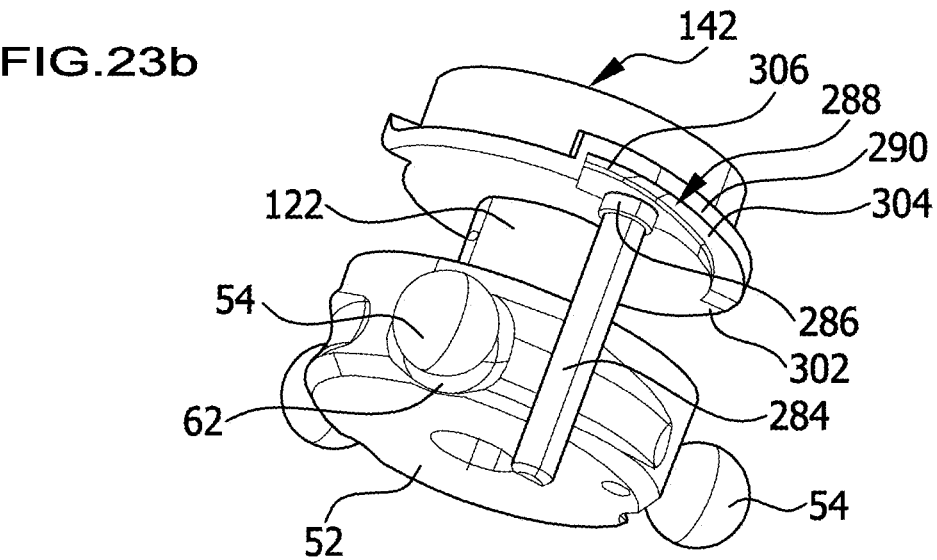

FIG.24
FIG.24a
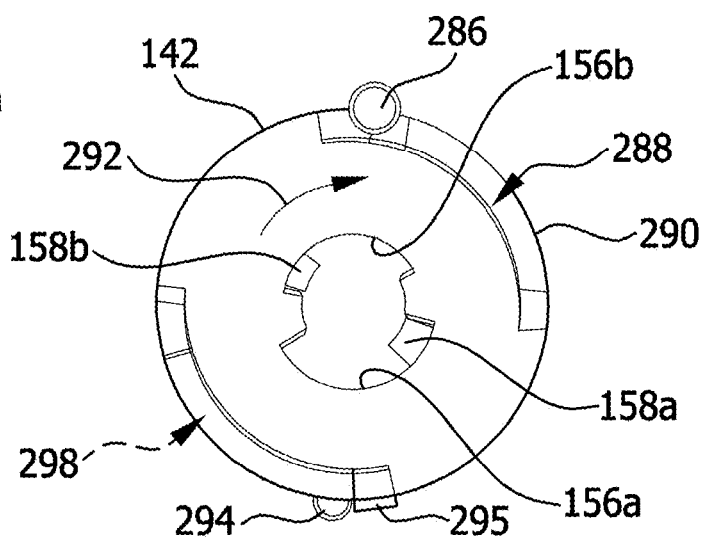
FIG.24c
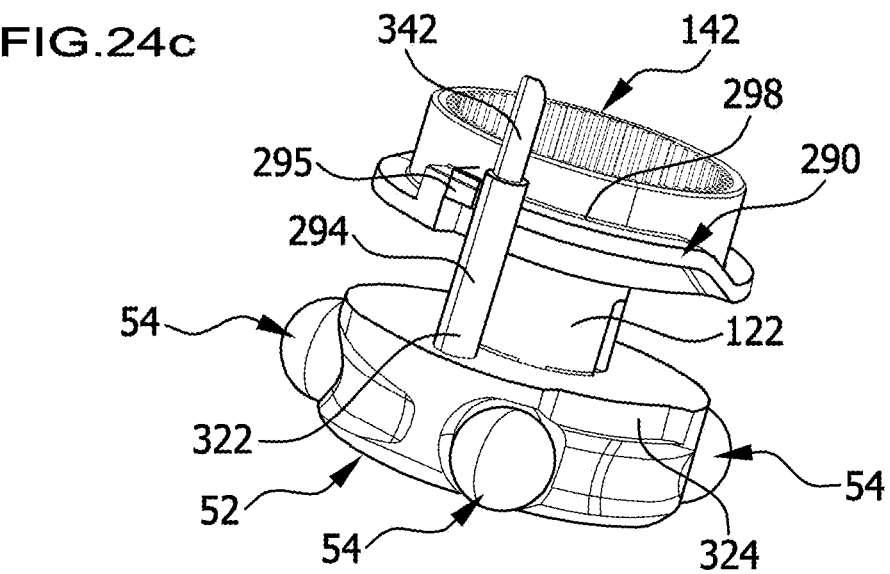
FIG.24b
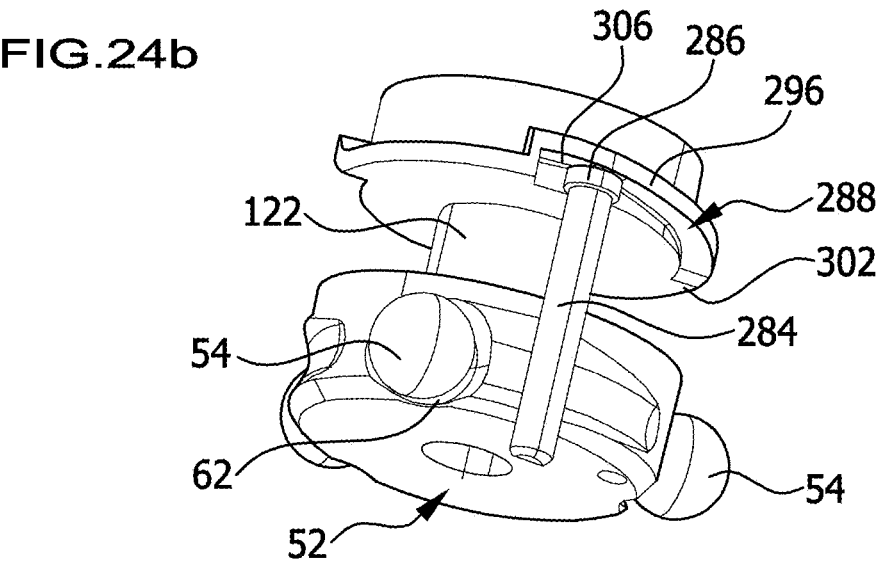

FIG.25
FIG.25a
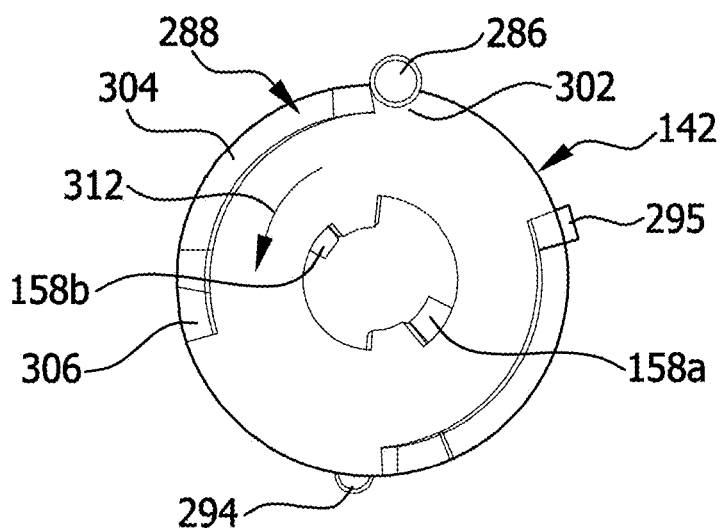
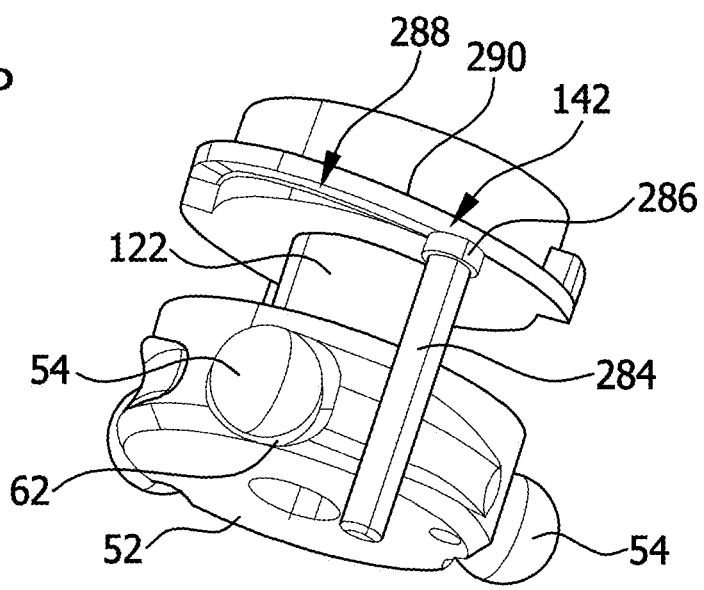
FIG.25c
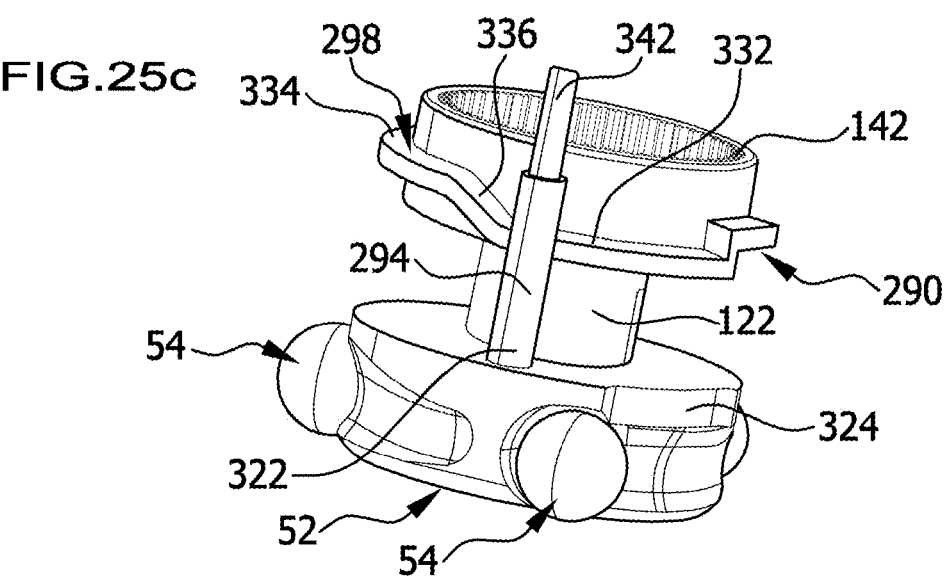
FIG.25b

FIG.26
FIG.26a
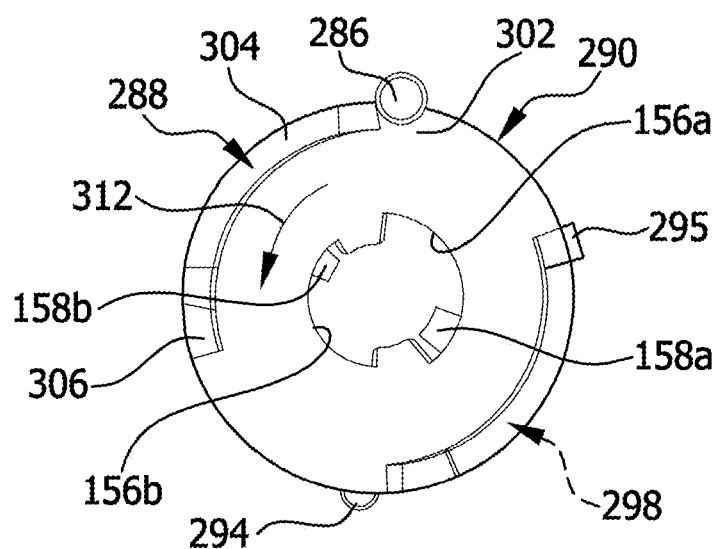
FIG.26c
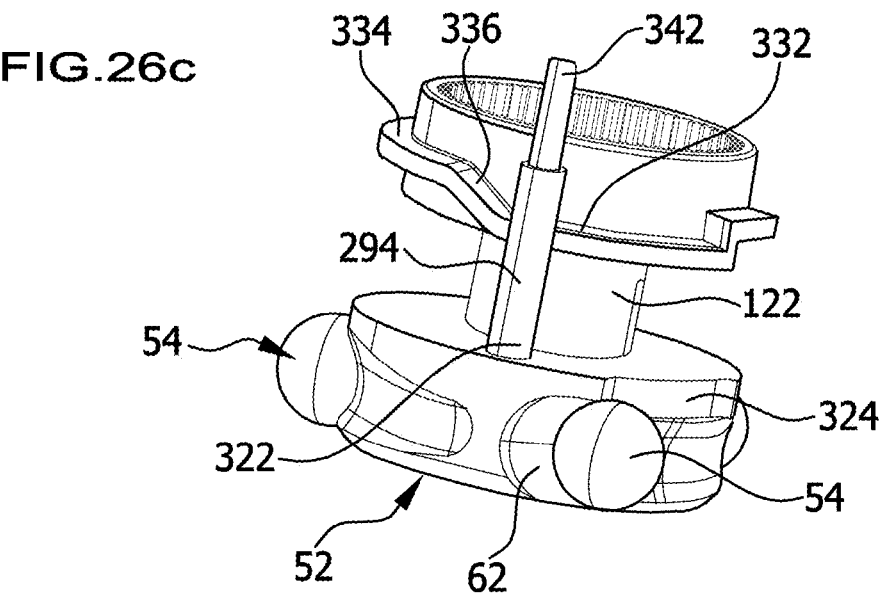
FIG.26b
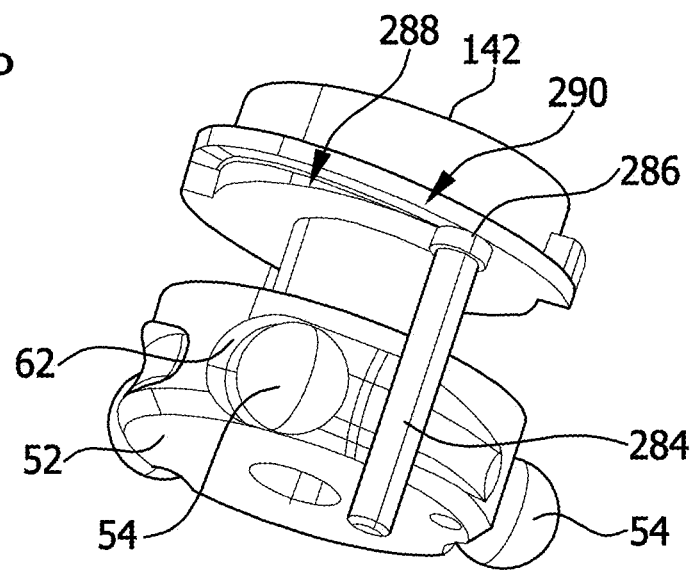

TRAILER HITCH

CROSS-REFERENCE TO RELATED PATENT APPLICATION

This patent application claims the benefit of German application No. 10 2020 111 469.9, filed Apr. 27, 2020, the teachings and disclosure of which are hereby Incorporated in their entirety by reference thereto.

BACKGROUND OF THE INVENTION

The invention relates to a trailer hitch, comprising a ball neck, which is movable between a working position and a rest position and has a pivot bearing body arranged at a first end and a coupling ball arranged at a second end, a pivot bearing unit, which is arranged fixed to a vehicle and by means of which the pivot bearing body is received such that it is pivotal for the purpose of performing a pivotal movement about a pivot axis between the working position and the rest position, and a rotation-blocking device that is active between the pivot bearing unit and the pivot bearing body and has on the one hand at least two rotation-blocking units, each of which has a rotation-blocking body that is guided in a manner movable in a guide direction by means of a guide receptacle in a guide body and is movable in the guide direction by a pressure face provided on an actuation body and running transversely to the guide direction, and on the other hand has at least two receptacles, wherein a movement of the actuation body in an actuation direction makes the rotation-blocking bodies of all the rotation-blocking units movable and urgeable in the guide direction, and wherein, in the working position, the rotation-blocking bodies of all the rotation-blocking units are configured to be brought into a rotation-blocking position by movement in the guide direction, and in this position each rotation-blocking body comes into engagement with a respective one of the receptacles in order to block a pivotal movement of the pivot bearing body about the pivot axis in relation to the guide body, and are configured to be brought into a release position, and in this position are disengaged from the respective receptacle and enable the pivotal movement of the pivot bearing body.

Trailer hitches of this kind are known from the prior art.

In these, the actuation body is fixed in its release position by means of a latching device provided for this purpose.

On the one hand, this solution is expensive and complex, and in some cases it is also susceptible to faults.

SUMMARY OF THE INVENTION

The object of the invention is therefore to achieve fixing of the rotation-blocking device in the release position in the simplest possible manner.

According to the invention, this object is achieved with a trailer hitch of the type mentioned in the introduction in that there run between the receptacles blocking faces against which the rotation-blocking bodies are configured to abut and from which the receptacles extend, in that the rotation-blocking units and the receptacles are arranged at angular spacings from one another around the pivot axis such that, in all the pivotal positions of the pivot bearing body that are provided, including the rest position and with the exception of the working position, the rotation-blocking body of at least one of the rotation-blocking units lies opposite one of the blocking faces, and thus, in particular if there is a force urging the actuation body in the direction of the actuation direction, this blocking face blocks movement of the actuation body in the actuation direction and consequently also blocks engagement, urged by force, of the rotation-blocking bodies of each rotation-blocking unit in a respective one of the receptacles.

The advantage of the solution according to the invention can thus be seen in the fact that the actuation body can be fixed in the release position in a simple and reliable manner by means of the rotation-blocking bodies, which are present in any case, and that moreover there is a significant reduction in noise as this trailer hitch is transferred from the release position into the rotation-blocking position of the rotation-blocking bodies, since the rotation-blocking bodies can slide from the blocking faces into the receptacles in a simple manner.

Further, the solution according to the invention is achieved with a trailer hitch of the type mentioned in the introduction in a manner that is an alternative or addition to the solution described above, in that the rotation-blocking units for forming a rotation-blocking configuration are arranged at angular spacings around the pivot axis, in that the receptacles for forming a receptacle configuration are arranged at the same angular spacings around the pivot axis as the rotation-blocking units, in that, in the working position, the rotation-blocking configuration and the receptacle configuration are mutually congruent such that the rotation-blocking bodies can engage in the receptacles, and in that the angular spacings between the rotation-blocking units of the rotation-blocking configuration and the angular spacings between the receptacles of the receptacle configuration are selected such that the rotation-blocking configuration and the receptacle configuration are only mutually congruent in the working position and thus only in this position allow the actuation body to be transferred from the release position into the rotation-blocking position, whereas in the other pivotal positions of the pivot bearing body it is not possible for the actuation body to be transferred from the release position into the rotation-blocking position.

As an alternative or in addition to the inventive solutions described above, a further advantageous solution provides for the angular spacings of at least one of the rotation-blocking units in relation to the rotation-blocking units arranged in a direction of revolution around the pivot axis and in relation to the rotation-blocking units arranged adjacent and in opposition to this direction of revolution to be dissimilar, and in that in the working position the receptacles are arranged such that the rotation-blocking bodies of each of the rotation-blocking units are configured to be brought into engagement with a respective one of the receptacles and in that, in all the pivotal positions of the pivot bearing body that are provided for operation and are outside the working position, including the rest position, the rotation-blocking body of at least one of the rotation-blocking units lies opposite a blocking face located between the receptacles, and thus, in particular if there is a force acting on the actuation body, this blocking face blocks movement of the actuation body from the release position into the rotation-blocking position.

The dissimilarity of the angular spacings comprises, by comparison with similar angular spacings, for example at least one deviation from similar angular spacings that is in the order of magnitude of half the angular range spanned by each of the receptacles, preferably up to the angular range spanned by each of the receptacles.

The advantage of all the inventive solutions mentioned above can be seen in the fact that a structurally simple solution is provided to keep the actuation body in the release position and only in the working position to allow it to be transferred into the rotation-blocking position, wherein in particular advantageously the rotation-blocking bodies that are in any case present for the rotation-blocking device can be used.

In conjunction with the inventive solution, it has proved particularly favorable if the number of rotation-blocking units corresponds to the number of receptacles.

Further, in particular in order to obtain a solution that is of spatially compact construction, in particular in the direction of the pivot axis, it is advantageous if the rotation-blocking bodies of all the rotation-blocking units take a form and are arranged such that they are symmetrical in relation to a geometric plane that runs perpendicular to the pivot axis and intersects it.

A particularly advantageous solution provides for the blocking faces to run facing the rotation-blocking bodies of the rotation-blocking units, in particular transversely, preferably perpendicular, to the guide direction, such that when the rotation-blocking bodies abut against the blocking faces, they are movable over them with little or virtually no resistance to movement.

It is particularly advantageous if the blocking faces run around the pivot axis at a defined radius such that during the pivotal movement the rotation-blocking bodies abutting against these blocking faces do not perform any additional radial movement in relation to the pivot axis.

Further, it is advantageously provided for the blocking faces to run as far as opening edges of the receptacles and to merge into these.

In particular, it is preferably provided for the opening edges of the receptacles to be located at the same radial spacing from the pivot axis as the blocking faces, with the result that it is possible for the rotation-blocking bodies abutting against the blocking faces to perform a movement beyond the opening edges and into the receptacles without any additional resistance to movement—as would occur for example if the spacings of the opening edges from the pivot axis differed from the spacing of the blocking faces from the pivot axis.

In particular, this solution also has the advantage that it produces a simple transfer, free of any resistance to movement, of the pivot bearing body from the working position into a pivotal position, since in this case too the rotation-blocking bodies can come out of the receptacles by way of the opening edges, substantially without any resistance to movement, and move in the direction of the blocking faces.

It is particularly advantageous if, in the event of a pivotal movement of the pivot bearing body in the direction of the working position, in particular during the pivotal movement from the rest position to the working position, at least one of the rotation-blocking bodies of the rotation-blocking units abuts against one of the blocking faces, in particular abutting in a manner urged by force by the actuation body, wherein the urging by force is performed for example by retraction receptacles in the actuation body that are provided for the release position of the rotation-blocking bodies and act on the rotation-blocking bodies by means of faces running transversely to the guide direction.

In particular, it is favorable if, before reaching the working position, the rotation-blocking bodies abut against the blocking faces in a manner urged by force and then enter the receptacles such that they abut against opening edges of the receptacles in a manner urged by force, with the result that this can keep the noise developed during transfer of the rotation-blocking bodies from the release position into the rotation-blocking position as low as possible—in contrast to a situation in which the rotation-blocking bodies first abut with play against the blocking faces, are then brought into abutment against the blocking faces in a manner urged by force, and then enter the receptacles from the blocking faces, or the situation in which the rotation-blocking bodies, with play in relation to the blocking faces, move into the working position and are urged by force in the working position in order to enter the receptacles.

As regards the form taken by the receptacles, it is particularly advantageous if the receptacles extend in the guide direction from the blocking faces, in particular with at least one component in the radial direction relative to the pivot axis, such that during movement in the guide direction the rotation-blocking bodies do not undergo any additional deflection as they enter the receptacles.

Further, more detailed statements have not been made as regards the orientation of the receptacles and the blocking faces in relation to the guide sleeve.

For example, an advantageous solution provides for the receptacles and the blocking faces to be arranged facing the guide sleeve, with the result that deflection-free movement of the rotation-blocking bodies can be performed in the direction of the blocking faces or in the direction of the receptacles.

In principle, the guide body could be pivotal about the pivot axis jointly with the pivot bearing body.

However, a solution that is structurally particularly favorable provides for the guide body to be part of the pivot bearing unit arranged fixed to the vehicle.

Further, as regards the form taken by the guide body, it is provided for all the guide receptacles for the rotation-blocking bodies of the rotation-blocking units to be arranged in the guide body.

Moreover, it is favorable if at least one component of the guide direction runs in the radial direction in relation to the pivot axis, with the result that the rotation-blocking bodies are moved by at least one component in the radial direction in relation to the pivot axis between the rotation-blocking position and the release position, and thus there is not exclusively movement of the rotation-blocking bodies in the direction of the pivot axis in order to move them between the rotation-blocking position and the release position.

A solution that is structurally particularly favorable provides for the guide body to have a guide sleeve with guide receptacles for the rotation-blocking bodies of the rotation-blocking units, and for in particular the rotation-blocking bodies to be guided by the guide body adjoining the pivot bearing body in the radial direction.

More details have not been given, in the context of explaining the exemplary embodiments above, of how the pivot bearing body is to be mounted such that it is pivotal on the pivot bearing unit.

For this purpose, a bearing provided for this could for example be provided on the pivot bearing unit and be independent of the guide body.

However, it is particularly simple from a structural point of view if the guide body has a pivot bearing for the pivot bearing body—that is to say either carries a pivot bearing for the pivot bearing body or itself forms a pivot bearing for the pivot bearing body, by means of an outer face.

More detailed statements have likewise not been made as regards the movement of the actuation body in relation to the guide body.

For example, an advantageous solution provides for the actuation body to be guided such that it is movable in relation to the guide body.

Here, the actuation body could be movable relative to the guide body between the rotation-blocking position and the release position, in the direction of the pivot axis, in order to move the rotation-blocking bodies in the corresponding positions.

A solution that has been particularly optimized in respect of space requirements provides for the actuation body to be arranged such that it is rotatable about the pivot axis and in particular to have wedge faces extending over an angular range around the pivot axis and varying in the direction parallel to the guide direction, preferably combined with retraction receptacles.

Moreover, more detailed statements have likewise not been made as regards the arrangement of the receptacles and the blocking faces.

For example, an advantageous solution provides for the receptacles and the blocking faces to be arranged on the pivot bearing body.

Furthermore, a structural solution is particularly favorable as regards absorption of the forces acting there if the actuation body is surrounded by the guide body, and if in particular the pivot bearing body embraces the guide body.

More detailed statements have likewise not been made as regards the arrangement of the rotation-blocking bodies in relation to the actuation body.

In principle, the rotation-blocking bodies could be arranged such that they are embraced by the actuation body.

For the spatial layout of the trailer hitch according to the invention, it has likewise proved advantageous if the rotation-blocking bodies are arranged around the actuation body.

It has proved particularly advantageous from a structural point of view if the pivot bearing body forms an outer body outwardly surrounding the pivot bearing unit, wherein the outer body is arranged to be non-displaceable in the direction of the pivot axis in relation to the pivot bearing unit, and if in particular the pivot bearing body forms an outer body that outwardly surrounds at least one section of the rotation-blocking unit and that is arranged to be non-displaceable in the direction of the pivot axis in relation to the guide body, with the result that when the rotation-blocking bodies are transferred from the rotation-blocking position to the release position and vice versa the pivot bearing body does not perform a movement in the direction of the pivot axis but can be arranged to be non-displaceable in the direction of the pivot axis.

An arrangement of the pivot bearing body of this kind on the one hand has the advantage of a favorable spatial layout of the pivot bearing unit itself and has the advantage of relatively simple sealing of the pivot bearing unit, since the pivot bearing body does not perform any movements in the axial direction of the pivot axis.

Preferably, there is provided between a housing of the pivot bearing unit and at least one end face of the outer body a seal that runs peripherally around the pivot axis and that provides sealing against the penetration of dirt and moisture.

With a solution of this kind, the pivot bearing body at the same time forms the outer body that surrounds and protects the pivot bearing unit, and because the outer body is arranged to be non-displaceable in the direction of the pivot axis in relation to the pivot bearing unit, the effect is in particular that simple sealing between the outer body and the pivot bearing unit is producible.

Particularly favorable from a structural point of view is a solution in which the pivot bearing body forms an outer body that outwardly surrounds a section of the rotation-blocking device and that is arranged to be non-displaceable in the direction of the pivot axis in relation to the guide body.

In particular, it is provided for the rotation-blocking bodies to be movable from the release position to the rotation-blocking position by the actuation body.

Preferably in this case, the actuation body takes a form such that, in the release position, it allows the release position of the rotation-blocking bodies.

In particular, a further embodiment of the rotation-blocking body provides, in the rotation-blocking position, for it to keep the rotation-blocking bodies in their rotation-blocking position.

In order to ensure that the rotation-blocking bodies are always transferred to their rotation-blocking position, in particular when there is no active actuation of the actuation body, it is preferably provided for the actuation body to be urged in the direction of its rotation-blocking position by a resilient energy store.

So that the actuation body can be moved from the rotation-blocking position into the release position, it is preferably provided for the actuation body to be movable from the rotation-blocking position into the release position by an actuation device.

In particular, movement of this kind, of the actuation body by the actuation device, is performed in opposition to urging by the energy store—that is to say that the actuation device counters urging by the energy store and thus has to overcome the forces exerted by the energy store.

In particular in the case of a rotary actuation body, it is preferably provided that, as a result of the actuation device, the actuation body is rotated in opposition to the direction of rotation brought about by the resilient energy store.

A resilient energy store of this kind may in principle be arranged in a plurality of locations.

It is particularly favorable from a structural point of view if the resilient energy store is arranged within the pivot bearing unit.

A further structurally favorable solution provides for the resilient energy store to be arranged on a side of the actuation body.

In this case, the resilient energy store can advantageously be coupled to the actuation element.

As regards action on the actuation body, the most diverse solutions are conceivable.

For example, an advantageous solution provides for the actuation device to have an output element that is coupled to the actuation body.

In principle, it would be possible to couple the output element and the actuation body rigidly to one another.

However, it is particularly favorable if the output element and the actuation body are coupled to one another by way of an entraining coupling device that allows a relative movement about a delimited angle of rotation, depending on the position of the output element and the position of the actuation body, in particular their rotary position.

In this case, the entraining coupling device could be a resilient connection member.

However, it is particularly simple if the entraining coupling device has a free condition, with no entrainment, and an entraining condition—that is to say that either the free condition or the entraining condition prevails.

In the context of the solutions above, the drive of the rotation-blocking device, which makes it possible to transfer the rotation-blocking device from at least one rotation-blocking position into a release position and vice versa, has only been explained in general terms.

Further, it is preferably provided for the actuation device for the rotation-blocking device to comprise a motorized drive unit.

In this case, a motorized drive unit that is associated exclusively with the actuation device for the rotation-blocking device could be provided.

However, it is particularly favorable if a motorized drive unit is provided as a pivotal drive for performing the pivotal movement of the pivot bearing body.

For example, it is conceivable to provide two motorized drives, wherein one motorized drive is provided for actuating the rotation-blocking device, and one motorized drive is provided for performing the pivotal movement of the pivot bearing body.

In particular because driving the rotation-blocking device is always performed at times when there is to be no pivotal movement of the pivot bearing body, and moreover a pivotal movement of the pivot bearing body only ever occurs when there is no requirement for driving the rotation-blocking device, it is conceivable to provide a switchover device that switches a supplied drive power—for example from a source of electricity—alternately from one drive to the other, such that the drive power available from a separate supply device—for example on the vehicle side—can be utilized either for actuating the rotation-blocking device or for pivoting the pivot bearing body.

In this case, however, it is imperative for an appropriate sensor arrangement to detect when the rotation-blocking device is in the rotation-blocking position or the free-running position and when the pivot bearing body is in the position corresponding to the working position or the position corresponding to the rest position, and the drive power has to be switched over from one drive to the other depending on the positions detected by the sensor arrangement.

If a drive of the rotation-blocking device is independent of the drive for the pivotal movement of the pivot bearing body, there is the problem that, in the event of a fault, the difficulty arises of identifying unambiguous starting positions both for the pivotal movement of the pivot bearing body and also for the rotation-blocking device.

It is particularly favorable if an output element for driving the rotation-blocking device and an output element for driving the pivotal movement of the pivot bearing body are coupled by an epicyclic gear driven by means of a drive element.

In this case, it is possible to drive the epicyclic gear using a single motorized drive unit, in particular a single electric drive unit.

The epicyclic gear is preferably a planetary gear.

It is particularly favorable if the first output element of the epicyclic gear acts as a pivotal drive on the pivot bearing body, for the purpose of pivoting the ball neck between the working position and the rest position, and the second output element of the epicyclic gear acts as a controller on the actuation body in order to move this from the rotation-blocking position into the release position.

Here, the epicyclic gear favorably takes a form such that it allows alternation between the output element for actuating the rotation-blocking device and the output element for performing the pivotal movement of the pivot bearing body.

In particular, the epicyclic gear can be used such that driving of the pivotal movement or of the rotation-blocking device is dependent on whether the output element for the rotation-blocking device or the pivotal movement of the pivot bearing body is inhibited.

The advantage of using an epicyclic gear can be seen in the fact that an epicyclic gear of this kind enables simple alternation from one output drive to the other, so one drive unit—for example comprising an electric drive motor and where appropriate a gear—is sufficient to alternately drive movements of the actuation body by way of the one output drive and to drive the pivotal movement of the ball neck between the working position and the rest position by way of the other output drive.

For example, it is provided for a sun wheel of the epicyclic gear to be drivable by the motorized drive.

Further, it is favorably provided for a ring gear of the epicyclic gear to be coupled to the output drive for the rotation-blocking device.

Further, it is favorably provided for a planet carrier of the epicyclic gear to be coupled to the output drive for the pivotal movement.

In order, in the case of an epicyclic gear driven by a single motorized drive, to drive either the rotation-blocking device or the pivotal movement, it is advantageously provided for driving of the pivotal movement or the rotation-blocking device to be dependent on whether the drive of the rotation-blocking device or the pivotal movement is inhibited.

Inhibition of this kind, of the pivotal movement or of the rotation-blocking device, is performable in diverse ways.

Inhibition of the pivotal movement is performable in a simple manner in that the pivot bearing part is lockable in relation to the pivot bearing unit such that when the pivot bearing part is locked the pivotal movement is necessarily inhibited.

Driving of the rotation-blocking device can be inhibited in the most diverse ways.

Here, a particularly favorable solution provides for an abutment element to be provided in the release position, for the purpose of inhibiting driving of the rotation-blocking device.

As regards the arrangement of the epicyclic gear, the most diverse solutions are conceivable.

A particularly compact solution provides for the epicyclic gear to be arranged in the pivot bearing unit coaxially in relation to the pivot axis.

Further, it is preferably provided for the epicyclic gear to be arranged on a side of the actuation element of the rotation-blocking device that faces the motorized drive.

For a compact layout, it is particularly useful if, as seen in the direction of the pivot axis, the epicyclic gear is driven on one side by the motorized drive unit and has an output drive for the actuation element on the opposite side.

In this way, preferably the epicyclic gear is arranged, as seen in the direction of the pivot axis, between the motorized drive unit and the actuation element.

Further, the epicyclic gear, the resilient energy store and the actuation element are preferably arranged such that they succeed one another in the direction of the pivot axis, in particular within the pivot bearing unit.

In order further to ensure that, despite being urged by the resilient energy store, the actuation body does not come out of its rotation-blocking position, it Is preferably provided for the actuation body to be blockable in its rotary position by a securing device.

In particular in this case, it is provided for the actuation body to be blockable by the securing device to prevent its reaching its release position, in order to ensure that the actuation body never of itself allows the release position of the rotation-blocking bodies, for example if there is a rupture in the resilient energy store urging the actuation body in the direction of its active position.

A securing device of this kind takes a form such that it requires action to override blocking of the actuation body.

For this reason, it is favorably provided for the actuation device for the rotation-blocking device to be coupled to the securing device such that release of blocking of the actuation body by the securing device can also be performed by way of the actuation device.

Preferably here, the securing device is coupled to the actuation device such that the securing device blocks a movement of the actuation body not triggered by actuation.

In particular, the securing device takes a form such that, if the actuation device is not actuated, the securing device blocks movement of the actuation body into its release position.

A favorable solution in this case provides for the drive element of the actuation device—for example the output element of the epicyclic gear—to be coupled to the securing device.

Favorably in this case, the output element—for example the output element of the epicyclic gear—can take a form such that, by way of the output element, action on the actuation body and action on the securing device are matched to one another such that actuation of the actuation device on the one hand results in blocking of the actuation body being overridden and on the other hand has the result that the actuation body is moved from the active position into the inactive position.

For example, for this purpose it is provided for the output element, in the course of moving from the starting position into an intermediate position, to transfer the securing device from the securing position into the unsecured position.

As regards the coupling between the output element and the securing device, the most diverse possibilities are conceivable.

For example, any type of coupling would be conceivable, for example also coupling by way of an electric control unit.

Here, a solution that is particularly favorable because of its simplicity provides for the output element and the securing device to be coupled to one another by way of a mechanical coupling device.

The mechanical coupling device favorably takes a form such that it controls action on the securing device by means of a cam track.

As regards the form taken by the securing device, the most diverse solutions are conceivable.

The securing device operates particularly reliably if it has a resilient energy store that always urges the securing device in the direction of its position in which the actuation body is secured or blocked in the rotation-blocking position.

Further, it is preferably provided for the securing device to be movable from its securing position into an unsecured position.

Preferably in this case, movement of the securing device into the unsecured position is likewise performed by the output unit for the actuation unit, in particular likewise by the second output element of the branching gear.

In the inventive solution it is provided, as described above, for the rotation-blocking device, once it has come out of the working position, to be ineffective as far as and on reaching the rest position.

Fixing the pivot bearing body in the rest position could be performed by a driven locking device.

A solution that is particularly favorable because of its simplicity provides a rest position latching device that is independent of the rotation-blocking device and which, in an Inactive position, allows movement of the pivot bearing body in relation to the pivot bearing unit and, in a latching position, fixes the pivot bearing body such that it cannot rotate in relation to the pivot bearing unit, and in that there is provided a deactivation unit by means of which the rest position latching device is deactivated independently of the pivotal movement of the pivot bearing body.

The advantage of the inventive solution can be seen in the fact that, with this, the ball neck can be fixed in the rest position independently of the rotation-blocking position of the rotation-blocking device, and thus the rotation-blocking position can be configured primarily for the loads in the working position, whereas the loads in the rest position of the ball neck are much smaller and so the rest position latching device can be of correspondingly simpler configuration, and in that the rest position latching device is performed in a simple manner, independently of the pivotal movement of the pivot bearing body, in particular independently of driving the pivotal movement of the pivot bearing body.

In principle, it would be conceivable for the rest position latching device to take a form such that it detects the rotary position of the pivot bearing body and then, when the rest position is reached, activates a latching procedure.

However, in order to make the latching as functionally secure as possible, it is preferably provided that, in the pivotal position of the pivot bearing body that corresponds to the rest position, the rest position latching device is transferred into the latching position automatically because of a spring element provided therein, such that there is no need for actuation of a latching element, required by a control unit, but rather there is an automatic mechanical function of the rest position latching device that ensures a high level of reliability.

The rest position latching device functions particularly reliably and securely in particular if, in the event that it is not in the latching position, it is always in a latching-ready position—that is to say it is always capable of moving into the latching position—and thus moves reliably into the latching position when the rest position is reached, without further action.

So that the rest position latching device can be suitably moved from the rest position latching position into the inactive position, it Is preferably provided for the rest position latching device to be configured to be deactivated by means of a deactivation unit, depending on a particular functional condition of the trailer hitch.

This means that in a particular functional condition—to take an example, for the purpose of preparing pivoting of the pivot bearing unit from the rest position into the working position of the trailer hitch—the rest position latching device can be transferred from the rest position into the inactive position by means of the deactivation unit.

Here, a particularly favorable solution provides for the rest position latching device to be configured to be deactivated by means of the deactivation unit before pivoting of the pivot bearing body from the rest position into the working position such that, after deactivation, in particular directly after deactivation, of the rest position latching device pivoting of the pivot bearing body from the rest position to the working position can be initiated and carried out.

Here, the deactivation unit could be actuated in the most diverse ways.

A favorable solution provides for the rest position latching device to be configured to be deactivated by means of the deactivation unit by a drive unit that cooperates with the deactivation unit such that in particular deactivation of the rest position latching device can be performed by a control unit that controls the drive unit.

In particular, in the case of the inventive rest position latching device having a deactivation unit of this kind, it is possible to provide a branching gear, which is drivable by means of a drive element, has a first output element by means of which driving of the pivotal movement of the pivot bearing body with the ball neck is performed, and has a second output element that cooperates with the deactivation unit for the purpose of deactivating the rest position latching device.

This means that the drive for the deactivation unit can branch off from a branching gear that on the one hand brings about driving of the pivotal movement of the pivot bearing body and on the other serves to drive the deactivation unit.

The branching gear may in this case take diverse forms.

For example, an advantageous solution provides for the branching gear to couple the drive element to the first output element or the second output element automatically.

Further, the branching gear may take the most diverse forms.

A simple and advantageous solution provides for the branching gear to be an epicyclic gear, in particular a planetary gear.

Further, it is favorably provided for the drive element of the branching gear to be driven by means of the drive unit, which is in particular operated electrically.

More detailed statements have not yet been made as regards the form taken by the rest position latching device.

For example, a particularly simple solution provides for the rest position latching device to comprise a latching body that is arranged in the pivot bearing body or the pivot bearing unit, that is movable in a latching direction and that is configured to be brought into engagement with a latching receptacle arranged in the pivot bearing unit or the pivot bearing body.

This solution in particular requires no additional space and thus allows the rest position latching device to take a particularly simple form.

In the simplest case here, the latching body that is movable in the latching direction is arranged in the pivot bearing body, and the latching receptacle is arranged in the pivot bearing unit.

However, it is also possible to arrange the latching body in the pivot bearing unit and the latching receptacle in the pivot bearing body.

Further, it is advantageous for the reliable functioning of the rest position latching device if the latching direction runs parallel to the pivot axis, since this simplifies movement of the latching body into the latching receptacle.

So that the rest position latching device can be deactivated in a simple manner, it is preferably provided for there to be associated with the latching receptacle an actuation body of the deactivation unit that, when the deactivation unit is active, expels the latching body from the latching receptacle and thus moves the rest position latching device out of the latching position.

In this way, the latching body can be moved from the rest position latching position into the inactive position mechanically and in particular in a structurally particularly simple manner.

Thus, the description above of inventive solutions comprises in particular the different combinations of features that are defined by the sequentially numbered embodiments below:

1. A trailer hitch, comprising a ball neck (10), which is movable between a working position (A) and a rest position (R) and has a pivot bearing body (14) arranged at a first end and a coupling ball (18) arranged at a second end, a pivot bearing unit (20), which is arranged fixed to a vehicle and by means of which the pivot bearing body (14) Is received such that it is pivotal for the purpose of performing a pivotal movement about a pivot axis (22) between the working position (A) and the rest position (R), and a rotation-blocking device (50) that is active between the pivot bearing unit (20) and the pivot bearing body (14) and has on the one hand at least two rotation-blocking units (80), each of which has a rotation-blocking body (54) that is guided in a manner movable in a guide direction (58) by means of a guide receptacle (56) in a guide body (40) and is movable in the guide direction (58) by a pressure face (66) provided on an actuation body (52) and running transversely to the guide direction (58), and on the other hand has at least two receptacles (60), wherein a movement of the actuation body (52) in an actuation direction (72) makes the rotation-blocking bodies (54) of all the rotation-blocking units (80) movable and urgeable in the guide direction (58), and wherein, in the working position (A), the rotation-blocking bodies (54) of all the rotation-blocking units (80) are configured to be brought into a rotation-blocking position by movement in the guide direction (58), and in this position each rotation-blocking body (54) comes into engagement with a respective one of the receptacles (60) in order to block a pivotal movement of the pivot bearing body (14) about the pivot axis (22) in relation to the guide body (40), and are configured to be brought into a release position, and in this position are disengaged from the respective receptacle (60) and enable the pivotal movement of the pivot bearing body (14), wherein there run between the receptacles (60) blocking faces (90) against which the rotation-blocking bodies (54) are configured to abut and from which the receptacles (60) extend, wherein the rotation-blocking units (80) and the receptacles (60) are arranged at angular spacings (W) from one another around the pivot axis (22) such that, in all the pivotal positions of the pivot bearing body (14) that are provided, including the rest position (R) and with the exception of the working position (A), the rotation-blocking body (54) of at least one of the rotation-blocking units (80) lies opposite one of the blocking faces (90), and, in particular if there is a force acting on the actuation body (52), the blocking face (90) blocks movement of the actuation body (52) in the actuation direction (72) and consequently also blocks engagement, urged by force, of the rotation-blocking bodies (54) of each of the rotation-blocking units (80) in a respective one of the receptacles (60).

2. The trailer hitch according to the preamble of embodiment 1 or according to embodiment 1, wherein the rotation-blocking units (80) for forming a rotation-blocking configuration are arranged at angular spacings (W) around the pivot axis (22), wherein the receptacles (60) for forming a receptacle configuration are arranged at the same angular spacings (W) around the pivot axis (22) as the rotation-blocking units (80), wherein, in the working position (A), the rotation-blocking configuration and the receptacle configuration are mutually congruent such that the rotation-blocking bodies (54) can engage in the receptacles (60), and wherein the angular spacings (W) between the rotation-blocking units (80) of the rotation-blocking configuration and the angular spacings between the receptacles (60) of the receptacle configuration are selected such that the rotation-blocking configuration and the receptacle configuration are only mutually congruent in the working position (A).

3. The trailer hitch according to the preamble of embodiment 1 or according to embodiment 1 or 2, wherein the angular spacings (W) of at least one of the rotation-blocking units (80) in relation to the rotation-blocking units (80) arranged in a direction of revolution around the pivot axis (22) and in relation to the rotation-blocking units (80)

arranged adjacent and in opposition to this direction of revolution are dissimilar, and in that in the working position (A) the receptacles (60) are arranged such that the rotation-blocking bodies (54) of each of the rotation-blocking units (80) are configured to be brought into engagement with a respective one of the receptacles (60) and in that, in all the pivotal positions of the pivot bearing body (14) that are provided for operation and are outside the working position (A), including the rest position (R), the rotation-blocking body (54) of at least one of the rotation-blocking units (80) lies opposite a blocking face (90) running between the receptacles (60), and, in particular if there is a force acting on the actuation body (52), the blocking face (90) blocks movement of the actuation body (52) from the release position into the rotation-blocking position.

4. The trailer hitch according to one of the preceding embodiments, wherein the blocking faces (90) run facing the rotation-blocking bodies (54) of the rotation-blocking units (80).

5. The trailer hitch according to one of the preceding embodiments, wherein the blocking faces (90) run around the pivot axis (22) at a defined radius.

6. The trailer hitch according to one of the preceding embodiments, wherein the blocking faces (90) run as far as opening edges (92) of the receptacles (60) and merge into these.

7. The trailer hitch according to embodiment 6, wherein the opening edges (92) of the receptacles (60) are located at the same radial spacing from the pivot axis (22) as the blocking faces (90).

8. The trailer hitch according to one of the preceding embodiments, wherein, in the event of a pivotal movement of the pivot bearing body (14) in the direction of the working position (A), at least one of the rotation-blocking bodies (54) of the rotation-blocking units (80) abuts against one of the blocking faces (90), in particular abutting in a manner urged by force by the action of the actuation body (52).

9. The trailer hitch according to one of the preceding embodiments, wherein, before reaching the working position (A), the rotation-blocking bodies (54) abut against the blocking faces (90) in a manner urged by force and then enter the receptacles (60) such that they abut against opening edges (92) of the receptacles (60) in a manner urged by force.

10. The trailer hitch according to one of the preceding embodiments, wherein the receptacles (60) extend in the guide direction (58) from the blocking faces (90), in particular with at least one component in the radial direction relative to the pivot axis (22).

11. The trailer hitch according to one of the preceding embodiments, wherein the receptacles (60) and the blocking face (90) are arranged facing the guide sleeve (40).

12. The trailer hitch according to one of the preceding embodiments, wherein the guide body (40) is part of the pivot bearing unit (20) arranged fixed to the vehicle.

13. The trailer hitch according to one of the preceding embodiments, wherein all the guide receptacles (56) for the rotation-blocking bodies (54) of the rotation-blocking units (80) are arranged in the guide body (40).

14. The trailer hitch according to one of the preceding embodiments, wherein at least one component of the guide direction (58) runs in the radial direction in relation to the pivot axis (22).

15. The trailer hitch according to one of the preceding embodiments, wherein the guide body (40) has a guide sleeve (44) with guide receptacles (56) for the rotation-blocking bodies (54) of the rotation-blocking units (80), and wherein in particular the rotation-blocking bodies (54) are guided by the guide body (40) adjoining the pivot bearing body (14) in the radial direction.

16. The trailer hitch according to one of the preceding embodiments, wherein the guide body (40) has a pivot bearing for the pivot bearing body (14).

17. The trailer hitch according to one of the preceding embodiments, wherein the actuation body (52) is guided such that it is movable in relation to the guide body (40).

18. The trailer hitch according to one of the preceding embodiments, wherein the actuation body (52) is arranged such that it is rotatable about the pivot axis (22) and in particular has wedge faces (66) extending over an angular range around the pivot axis (22) and varying in the direction parallel to the guide direction (58), preferably combined with retraction receptacles (62).

19. The trailer hitch according to one of the preceding embodiments, wherein the receptacles (60) and the blocking faces (90) are arranged on the pivot bearing body (14).

20. The trailer hitch according to one of the preceding embodiments, wherein the actuation body (52) is surrounded by the guide body (40), and wherein in particular the pivot bearing body (14) embraces the guide body (40).

21. The trailer hitch according to one of the preceding embodiments, wherein the rotation-blocking bodies (54) are arranged around the actuation body (52).

22. The trailer hitch according to one of the preceding embodiments, wherein the pivot bearing body (14) forms an outer body outwardly surrounding the pivot bearing unit (20), wherein the outer body is arranged to be non-displaceable in the direction of the pivot axis (22) in relation to the pivot bearing unit (20), and wherein in particular the pivot bearing body (14) forms an outer body that outwardly surrounds at least one section of the rotation-blocking unit (50) and that is arranged to be non-displaceable in the direction of the pivot axis (22) in relation to the guide body (40).

23. The trailer hitch according to one of the preceding embodiments, wherein the actuation body (52) is urged in the direction of its rotation-blocking position by a resilient energy store (114).

24. The trailer hitch according to one of the preceding embodiments, wherein the actuation body (52) is movable from the rotation-blocking position into the release position by an actuation device (180).

25. The trailer hitch according to embodiment 23 or 24, wherein the actuation body (52) is movable by the actuation device (180) in opposition to urging by the energy store (114).

26. The trailer hitch according to one of embodiments 23 to 25, wherein, by means of the actuation device (180), the actuation body (52) is rotatable in opposition to the direction of actuation (72) brought about by the resilient energy store (114).

27. The trailer hitch according to one of the preceding embodiments, wherein the actuation device (180) has an output element (142) that is coupled to the actuation body (52).

28. The trailer hitch according to embodiment 27, wherein the output element (142) and the actuation body (52) are coupled to one another by way of an entraining coupling device (156, 158).

29. The trailer hitch according to embodiment 28, wherein the entraining coupling device (156, 158) has a free condition, with no entrainment, and an entraining condition.

30. The trailer hitch according to one of the preceding embodiments, wherein the actuation device (180) for the rotation-blocking device (50) comprises a motorized drive unit.

31. The trailer hitch according to one of the preceding embodiments, wherein the motorized drive unit (182) is also provided as a pivotal drive for performing the pivotal movement of the pivot bearing body (14).

32. The trailer hitch according to one of the preceding embodiments, wherein an output element (142) for driving the rotation-blocking device (50) and the output element (152) and for driving the pivotal movement of the pivot bearing body (14) are coupled by an epicyclic gear (130).

33. The trailer hitch according to embodiment 32, wherein the epicyclic gear (130) is drivable using a single motorized drive unit (182).

34. The trailer hitch according to one of the preceding embodiments, wherein the first output element (152) of the epicyclic gear (130) acts as a pivotal drive on the pivot bearing body (14), for the purpose of pivoting the ball neck (10) between the working position (A) and the rest position (R), and wherein the second output element (142) of the epicyclic gear (130) acts as a controller on the actuation body (52) in order to move this from the rotation-blocking position into the release position.

35. The trailer hitch according to embodiment 34, wherein the epicyclic gear (130) allows alternation between the output element (142) for actuating the rotation-blocking device (50) and the output element (152) for performing the pivotal movement of the pivot bearing body (14).

36. The trailer hitch according to one of the preceding embodiments, wherein, dependent on whether the output element (142, 152) for the rotation-blocking device (50) or the pivotal movement of the pivot bearing body (14) is inhibited, there occurs driving of the pivotal movement or of the rotation blocking device (50).

37. The trailer hitch according to one of embodiments 32 to 36, wherein the epicyclic gear (130) is arranged coaxially in relation to the pivot axis (22).

38. The trailer hitch according to one of embodiments 32 to 37, wherein the epicyclic gear (130) is arranged on a side of the actuation element (52) that faces the motorized drive (182).

39. The trailer hitch according to one of embodiments 32 to 38, wherein, as seen in the direction of the pivot axis (22), the epicyclic gear (130) is driven on one side by the motorized drive unit (182) and has an output drive (142) for the actuation element (52) on the opposite side.

40. The trailer hitch according to one of embodiments 32 to 39, wherein the epicyclic gear (130) is arranged, as seen in the direction of the pivot axis (22), between the motorized drive unit (182) and the actuation element (52).

41. The trailer hitch according to one of embodiments 32 to 40, wherein the epicyclic gear (130), the resilient energy store (114) and the actuation element (52) are arranged such that they succeed one another in the direction of the pivot axis (22).

42. The trailer hitch according to one of the preceding embodiments, wherein the actuation body (52) is blockable in its rotation-blocking position by a securing device (330).

43. The trailer hitch according to embodiment 42, wherein the actuation body (52) is blockable by the securing device (330) to prevent its reaching its release position.

44. The trailer hitch according to one of the preceding embodiments, wherein there is provided a rest position latching device (270) that is independent of the rotation-blocking device (50) and which, in an inactive position, allows movement of the pivot bearing body (14) in relation to the pivot bearing unit (20) and, in a latching position, fixes the pivot bearing body (14) such that it cannot rotate in relation to the pivot bearing unit (20), and wherein there is provided a deactivation unit (280) by means of which the rest position latching device (270) is deactivated independently of the pivotal movement of the pivot bearing body (14).

45. The trailer hitch according to embodiment 44, wherein, when the rotary position of the pivot bearing body (14) that corresponds to the rest position (R) is reached, the rest position latching device (270) is transferred into the latching position automatically because of a spring element (276) provided therein.

46. The trailer hitch according to embodiment 44 or 45, wherein, in the event that the rest position latching device (270) is not in the latching position, it is always in a latching-ready position.

47. The trailer hitch according to one of embodiments 44 to 46, wherein the rest position latching device (270) is configured to be deactivated by means of the deactivation unit (280), depending on a particular functional condition of the trailer hitch.

48. The trailer hitch according to embodiment 47, wherein the rest position latching device (270) is configured to be deactivated by means of the deactivation unit (280) before pivoting of the pivot bearing body (14) from the rest position (R) into the working position (A).

49. The trailer hitch according to one of embodiments 44 to 48, wherein the rest position latching device (270) is configured to be deactivated by means of the deactivation unit (280) by a drive unit (182) that cooperates with the deactivation unit (280).

50. The trailer hitch according to one of embodiments 44 to 49, wherein there is provided a branching gear (130), which is drivable by means of a drive element (162), has a first output element (152) by means of which driving of the pivotal movement of the pivot bearing body (14) with the ball neck (18) is performed, and has a second output element (142) that cooperates with the deactivation unit (280) for the purpose of deactivating the rest position latching device (270).

51. The trailer hitch according to embodiment 50, wherein the branching gear (130) couples the drive element (162) to the first output element (152) or the second output element (142) automatically.

52. The trailer hitch according to embodiment 50 or 51, wherein the branching gear is an epicyclic gear (130), in particular a planetary gear.

53. The trailer hitch according to one of embodiments 50 to 52, wherein the drive element (162) of the branching gear (130) is driven by means of the drive unit (182), which is in particular operated electrically.

54. The trailer hitch according to one of the preceding embodiments, wherein the rest position latching device (270) comprises a latching body (274) that is arranged in the pivot bearing body (14) or the pivot bearing unit (20), that is movable in a latching direction and that is configured to be brought into engagement with a latching receptacle (282) arranged in the pivot bearing unit (20) or the pivot bearing body (14).

55. The trailer hitch according to embodiment 54, wherein the latching body (274) that is movable in the latching direction is arranged in the pivot bearing body (14), and wherein the latching receptacle (282) is arranged in the pivot bearing unit (20).

56. The trailer hitch according to embodiment 54 or 55, wherein the latching direction runs parallel to the pivot axis (22).

57. The trailer hitch according to one of embodiments 54 to 56, wherein there is associated with the latching receptacle (282) an actuation body (284) of the deactivation unit (280) that, when the deactivation unit (280) is active, expels the latching body (274) from the latching receptacle (282).

Further features and advantages of the solution according to the invention form the subject matter of the description below and the representation in the drawing of an exemplary embodiment.

BRIEF DESCRIPTION OF THE DRAWINGS

FIG. 20 shows the following in the starting position:

FIG. 20a shows a plan view of the ring gear of the planetary gear, from the drive sleeve side;

FIG. 20b shows a perspective illustration of cooperation of the ring gear in the position of FIG. 20a with the deactivation unit for the rest position latching device and with the rotation-blocking device;

FIG. 20c shows a perspective illustration of cooperation of the ring gear in the position of FIG. 20a with a securing device and with the rotation-blocking device;

FIG. 21 shows the following, in the first position of the ring gear as it is rotated in relation to the starting position, for releasing the securing device and without action on the rotation-blocking device:

FIG. 21a shows a plan view of the ring gear of the planetary gear, from the drive sleeve side;

FIG. 21b shows a perspective illustration of cooperation of the ring gear in the position of FIG. 21a with the deactivation unit for the rest position latching device and with the rotation-blocking device;

FIG. 21c shows a perspective illustration of cooperation of the ring gear in the position of FIG. 21a with a securing device and with the rotation-blocking device;

FIG. 22 shows the following, in a position of the ring gear that is rotated to the maximum extent in relation to the starting position, without action on the rotation-blocking device:

FIG. 22a shows a plan view of the ring gear of the planetary gear, from the drive sleeve side;

FIG. 22b shows a perspective illustration of cooperation of the ring gear in the position of FIG. 22a with the deactivation unit for the rest position latching device and with the rotation-blocking device;

FIG. 22c shows a perspective illustration of cooperation of the ring gear in the position of FIG. 22a with a securing device and with the rotation-blocking device;

FIG. 23 shows the following, in a position of the ring gear as it is rotated in relation to the starting position, on reaching the release position of the rotation-blocking device:

FIG. 23a shows a plan view of the ring gear of the planetary gear, from the drive sleeve side;

FIG. 23b shows a perspective illustration of cooperation of the ring gear in the position of FIG. 23a with the deactivation unit for the rest position latching device and with the rotation-blocking device;

FIG. 23c shows a perspective illustration of cooperation of the ring gear in the position of FIG. 23a with a securing device and with the rotation-blocking device;

FIG. 24 shows the following, in a position of the ring gear as it is rotated in relation to the starting position, on reaching the rest position of the pivot bearing body:

FIG. 24a shows a plan view of the ring gear of the planetary gear, from the drive sleeve side;

FIG. 24b shows a perspective illustration of cooperation of the ring gear in the position of FIG. 24a with the deactivation unit for the rest position latching device and with the rotation-blocking device;

FIG. 24c shows a perspective illustration of cooperation of the ring gear in the position of FIG. 24a with a securing device and with the rotation-blocking device;

FIG. 25 shows the following, in a position of the ring gear as it is rotated in relation to the starting position, and with deactivation of the rest position latching device:

FIG. 25a shows a plan view of the ring gear of the planetary gear, from the drive sleeve side;

FIG. 25b shows a perspective illustration of cooperation of the ring gear in the position of FIG. 25a with the deactivation unit for the rest position latching device and with the rotation-blocking device;

FIG. 25c shows a perspective illustration of cooperation of the ring gear in the position of FIG. 25a with a securing device and with the rotation-blocking device;

FIG. 26 shows the following, in a position of the ring gear as it is rotated in relation to the starting position in FIG. 20, during transfer of the rotation-blocking device into the rotation-blocking position:

FIG. 26a shows a plan view of the ring gear of the planetary gear, from the drive sleeve side;

FIG. 26b shows a perspective illustration of cooperation of the ring gear in the position of FIG. 26a with the deactivation unit for the rest position latching device and with the rotation-blocking device; and FIG. 26c shows a perspective illustration of cooperation of the ring gear in the position of FIG. 26a with a securing device and with the rotation-blocking device.

DETAILED DESCRIPTION OF THE INVENTION

Figure 1:
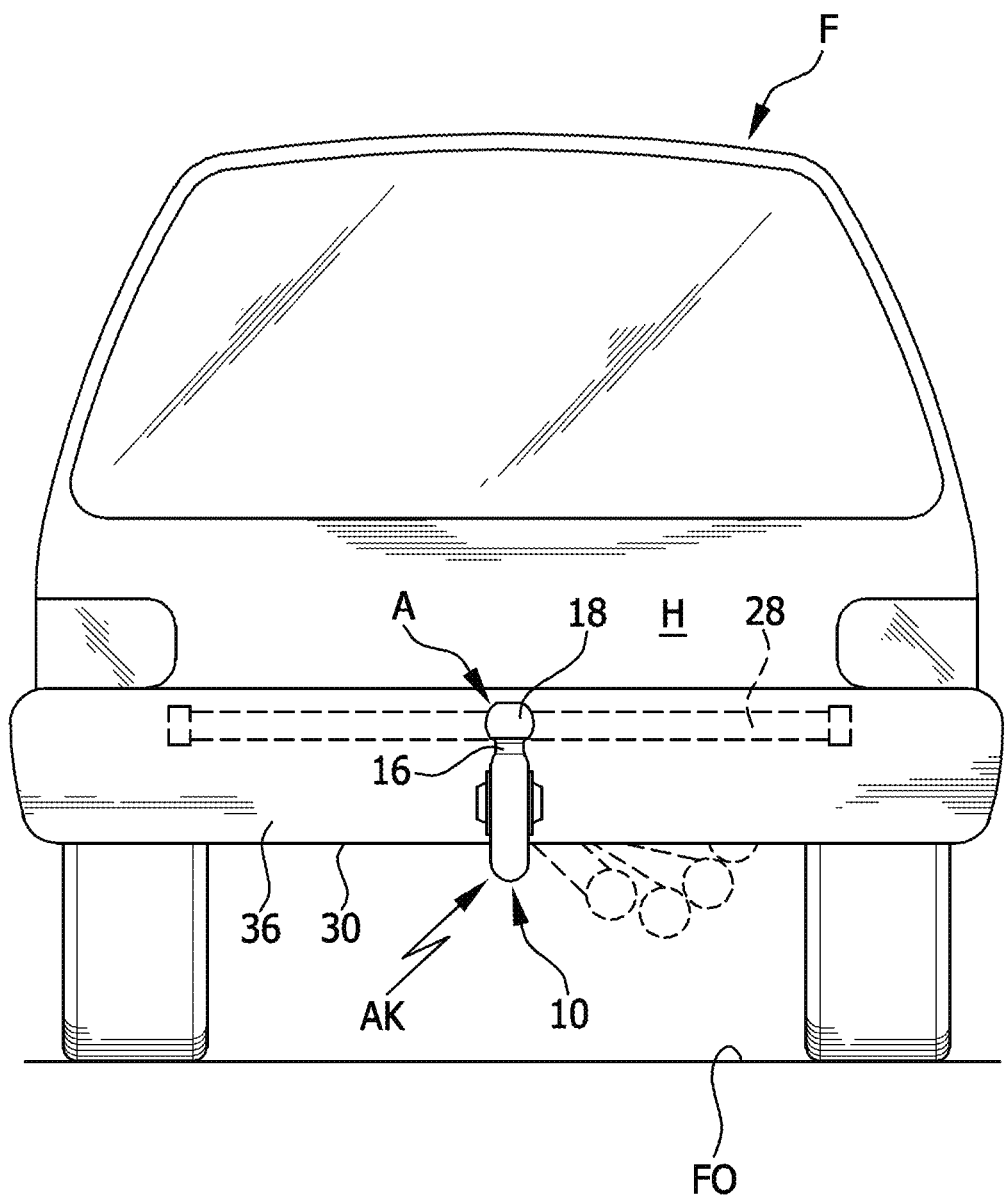
FIG. 1 shows a rear view of a motor vehicle with a trailer hitch according to the invention.
Figure 2:
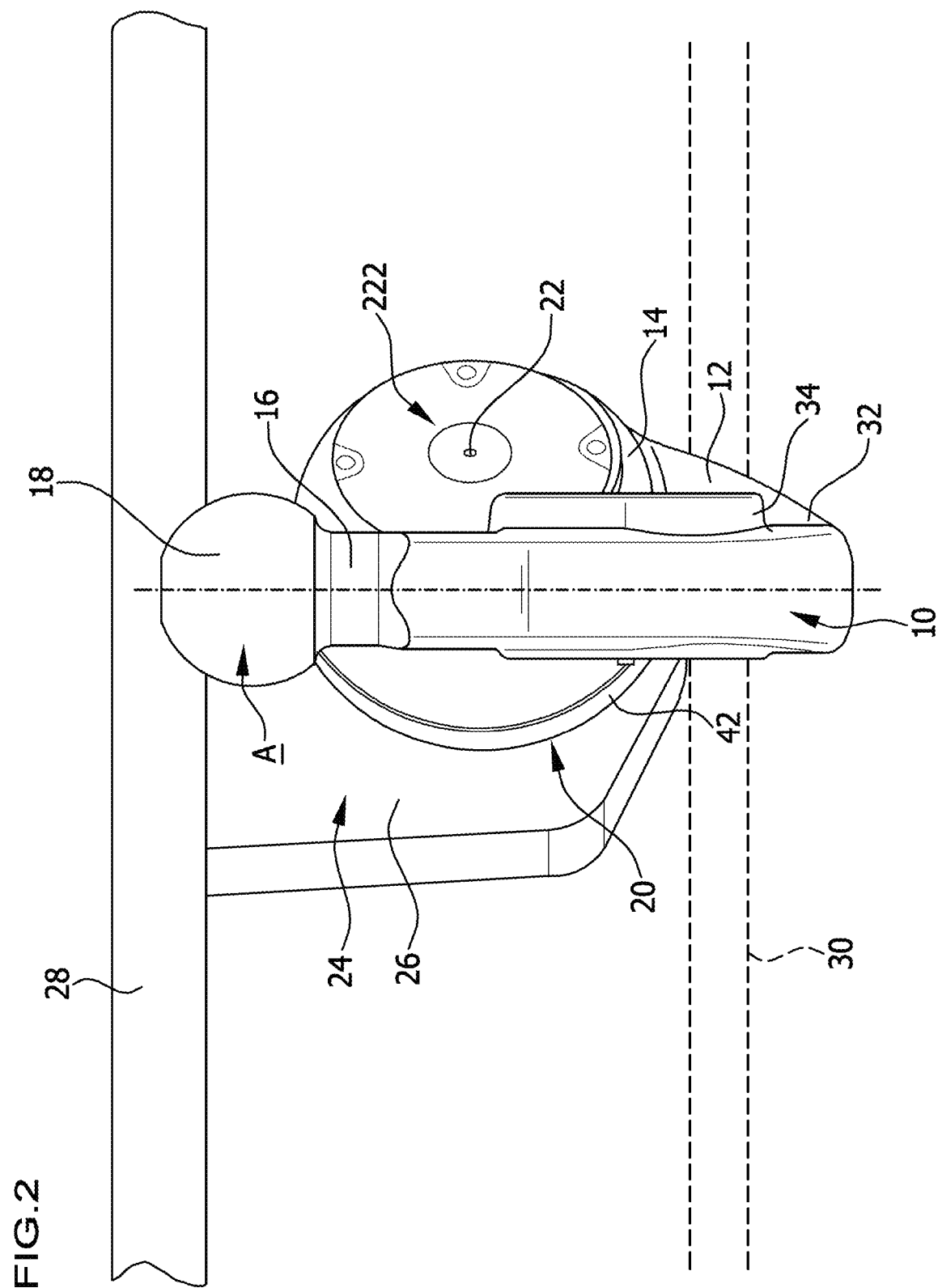
FIG. 2 shows a plan view of a first exemplary embodiment of a trailer hitch according to the invention, with a view in the direction of travel of the trailer hitch mounted on a vehicle rear, wherein the trailer hitch is in its working position.
Figure 3:
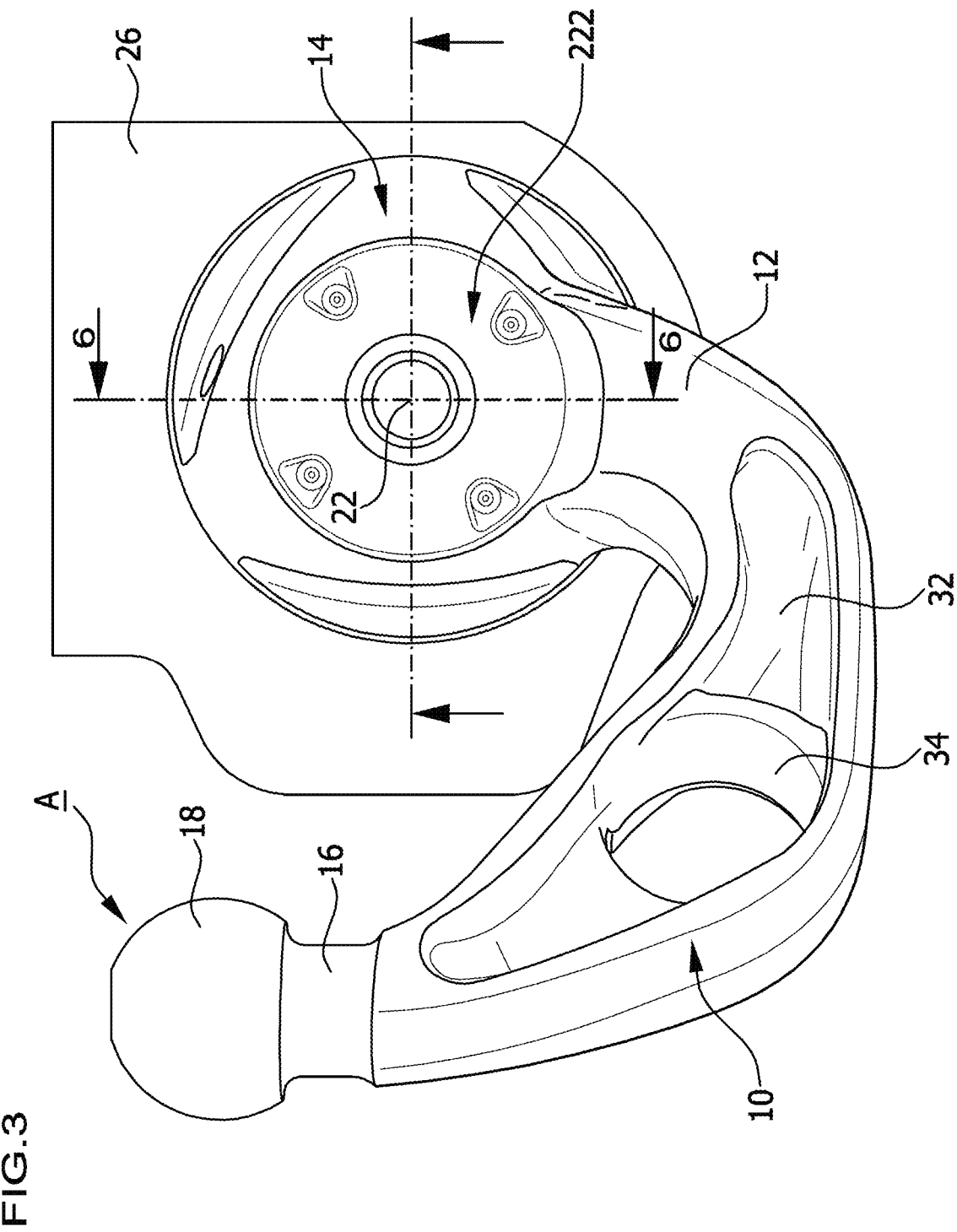
FIG. 3 shows a plan view of the trailer hitch in FIG. 2, in the direction of the pivot axis.
Figure 4:
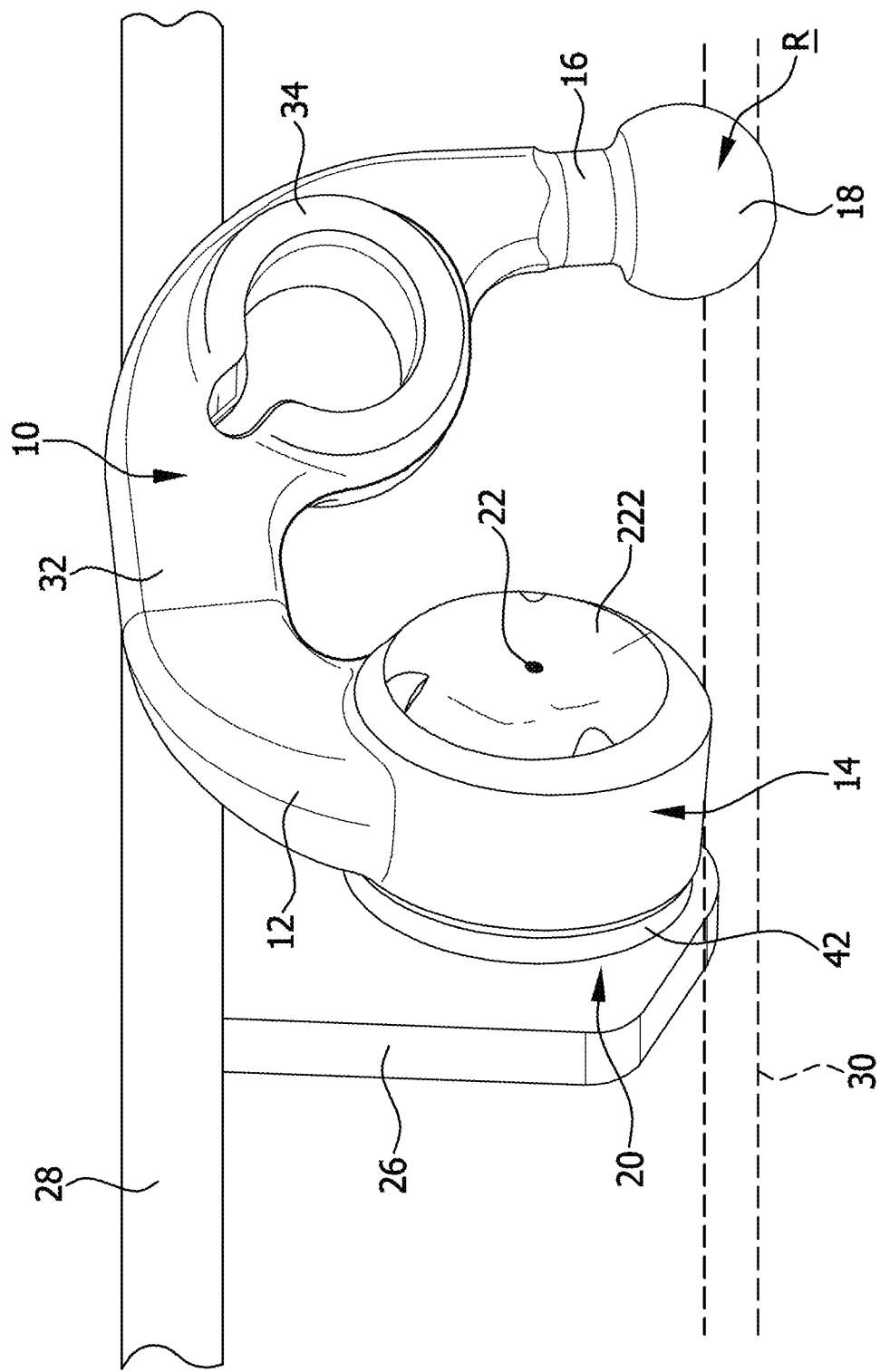
FIG. 4 shows a view corresponding to FIG. 2, of the trailer hitch in the rest position.
Figure 5:
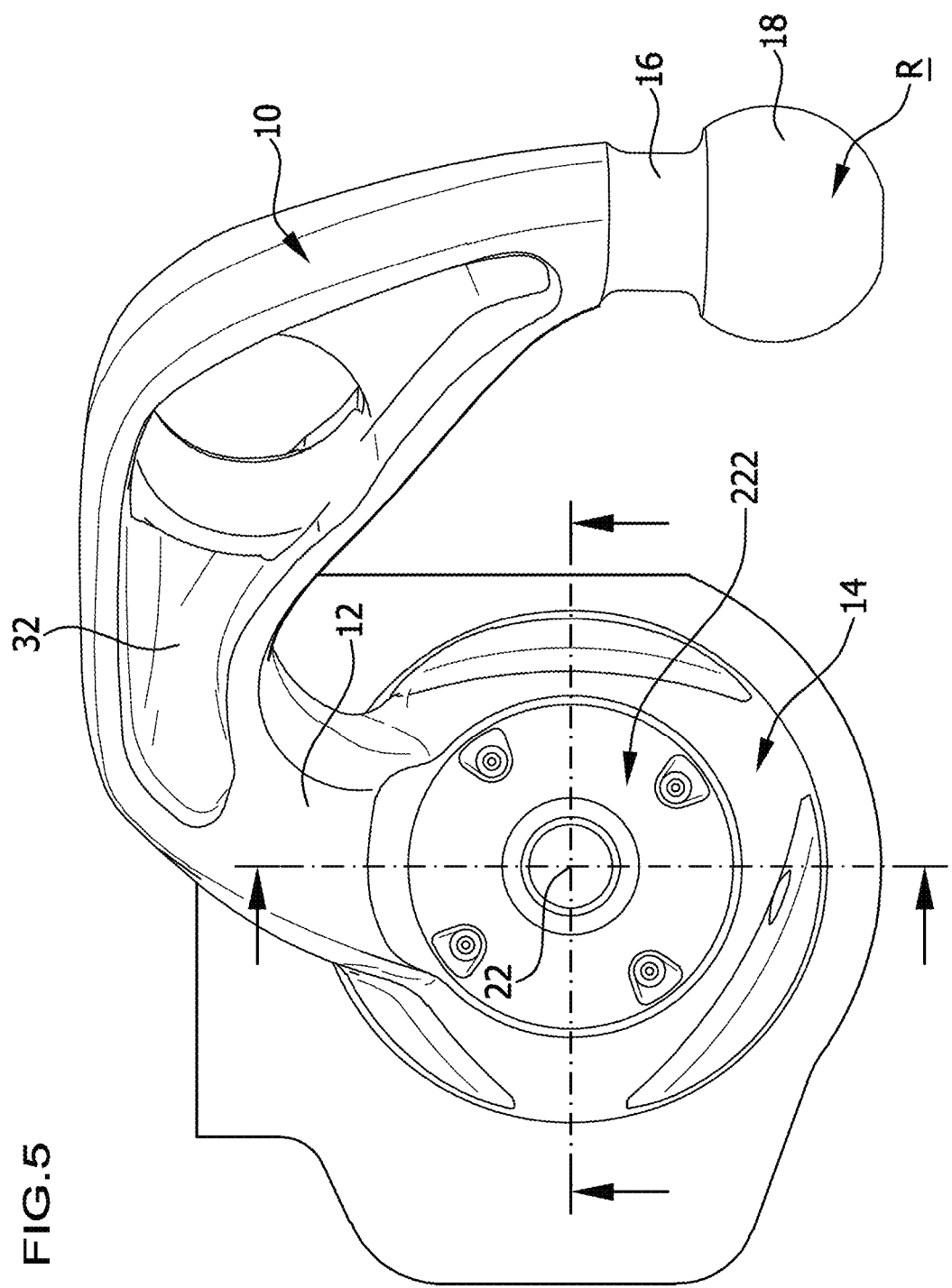
FIG. 5 shows a plan view of the trailer hitch in accordance with the trailer hitch from FIG. 4 in the rest position, in the direction of the pivot axis.

A first exemplary embodiment of a trailer hitch AK according to the invention for a motor vehicle, which is illustrated in a working position A in FIGS. 1, 2 and 3 and in a rest position R in FIGS. 4 and 5, comprises a ball neck, which is designated 10 as a whole, is held at a first end 12 on a pivot bearing body 14, and carries at a second end 16 a coupling ball, designated 18 as a whole, wherein a coupling ball receptacle of a trailer is configured to be fixed on the coupling ball.

The pivot bearing body 14 is mounted such that it is pivotal about a pivot axis 22 in relation to a carrier 24 fixed to the vehicle, by a pivot bearing unit that is designated 20 as a whole, wherein the carrier 24 preferably has a bearing plate 26, which holds the pivot bearing unit 20 and preferably extends in a plane perpendicular to the pivot axis 22, and a transverse carrier 28, which is fixed to the vehicle and is configured to be secured in known manner to a rear region H of a vehicle body F such that the pivot bearing unit 20 and the carrier 24 are located on a side of a lower edge 30 of a bumper unit 36 that is remote from the road surface FO, and are covered by the bumper unit 36 (FIG. 3).

In the working position, which is illustrated in FIGS. 1 and 2, the ball neck 10 engages below the lower edge 30 of the bumper unit 36 by means of a portion 32 adjoining the first end 12, such that the second end 16 and the coupling ball 18, together with a plug socket 34, are located on a side of the rear bumper unit 36 remote from the vehicle body F, whereas in the rest position both the pivot bearing unit 20 and also the entire ball neck 10, together with the coupling ball 18, are covered from view from the back by the rear bumper unit 36.

As illustrated in FIGS. 6 to 9, the pivot bearing unit 20 comprises a guide body 40, which is fixedly connected to the bearing plate 26 by a flange 42, and a guide sleeve 44 that extends away from the bearing plate 26, starting from the flange 42, wherein the pivot bearing body 14 is rotatably mounted on the guide sleeve 44.

For this purpose, the guide sleeve 44 comprises a cylinder outer face 46 against which the pivot bearing body 14 abuts by means of a cylinder inner face 48 and hence undergoes rotary guidance about the axis 22, about the pivot axis 22, with the result that the pivot bearing body 14 is rotatable in relation to the guide body 40 such that the ball neck 10 is pivotal from the working position A into the rest position R and vice versa.

Figure 15:
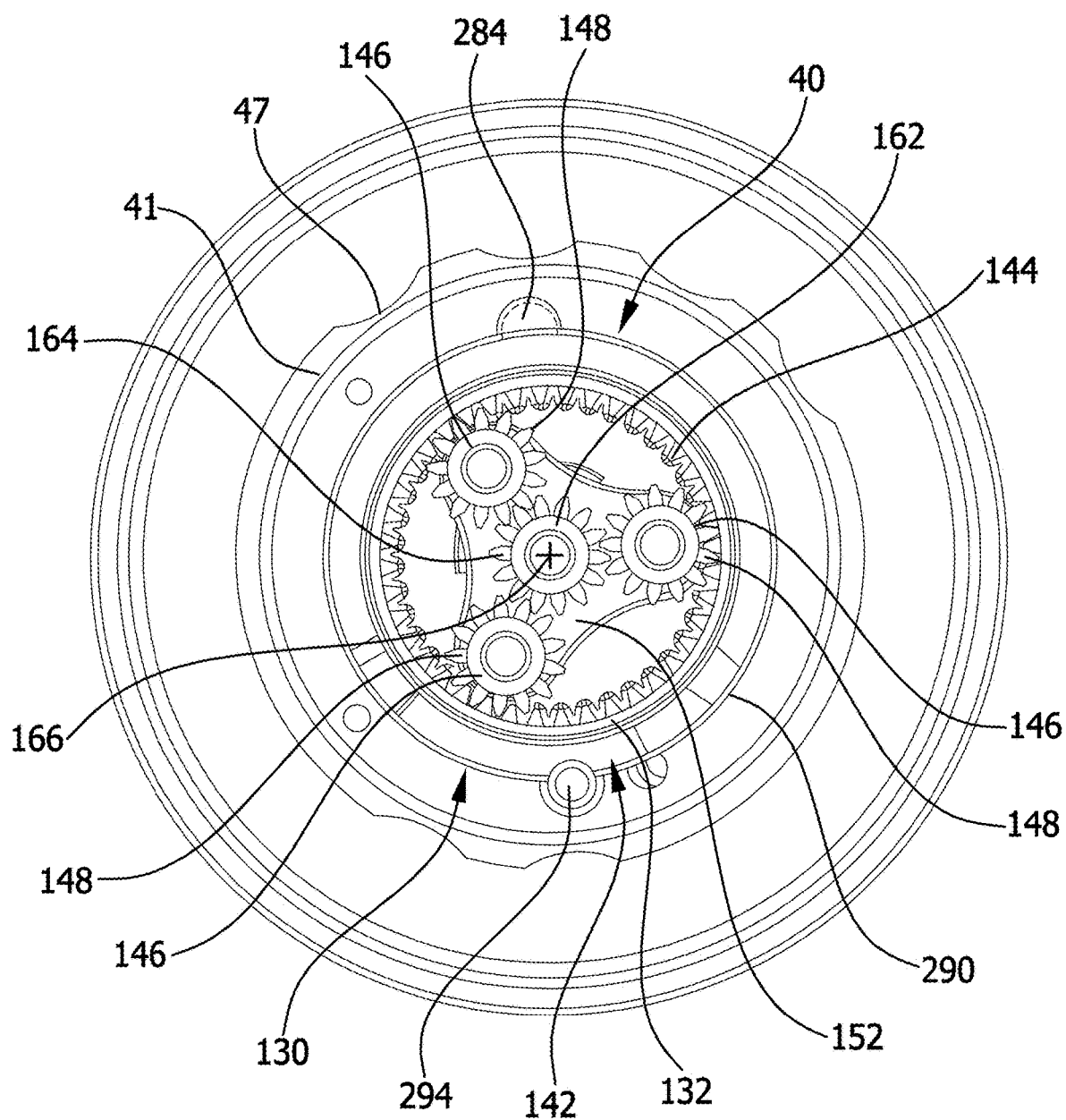
FIG. 15 shows a section along the line 15-15 in FIG. 6, without a bearing plate or holding ring.

Moreover, the guide body 40 comprises a prolonged portion 41 that extends through an aperture 27 in the bearing plate 26 and has a receptacle 43 that follows on from the prolonged portion 41 on an opposite side to the flange 42, for a holding ring 45 that is configured to be fixed at the receptacle 43, with the result that the guide body 40 is seated with positive engagement in the bearing plate 26, such that it cannot rotate in relation thereto, by the prolonged portion 41 as a result of its non-rotationally symmetrical but, rather, radially varying external contour 47 (FIG. 15) in the correspondingly shaped aperture 27, and is fixed to this bearing plate 26 by the flange 42 and the holding ring 45, which abut against opposite sides of the bearing plate 26.

Thus, as a result of being fixedly connected to the bearing plate 26 and the carrier 24, the guide body 40 forms the rotary bearing, fixed to the vehicle, for the pivot bearing body 14.

For the purpose of fixing the pivot bearing body 14 in the working position A, the pivot bearing unit 20 is provided with a rotation-blocking device, designated 50 as a whole (FIG. 7 to FIG. 14), which has an actuation body 52, a plurality of rotation-blocking bodies 54 that are urgeable by the actuation body 52 and of which each is guided such that they are movable in a guide receptacle 56 in the guide sleeve 44 in a guide direction 58 extending substantially radially in relation to the pivot axis 22.

Preferably, at least the rotation-blocking bodies 54 and the guide receptacles 56 are arranged symmetrically in relation to a geometric plane that runs perpendicular to the pivot axis 22, intersects the rotation-blocking bodies 54 and corresponds to the plane of the drawing in FIGS. 7 to 14.

Further, the rotation-blocking device 50 comprises receptacles 60 that extend in particular in the radial direction in relation to the pivot axis 22, starting from the inner face 48 of the pivot bearing body 14 and extending into it, wherein the rotation-blocking bodies 54 are configured to be brought into engagement with the receptacles 60 in the working position A, and wherein the receptacles 60 have wall faces that are at a smaller and smaller spacing from one another in the radial direction in relation to the pivot axis 22.

If for example the rotation-blocking device 50 comprises a set of three rotation-blocking bodies 54a, 54b and 54c—as illustrated in the first exemplary embodiment in conjunction with FIG. 7 to FIG. 14—then the guide sleeve 44 has a corresponding set of three guide receptacles 56a, 56b and 56c in which the rotation-blocking bodies 54a, 54b and 54c are displaceably guided in the guide direction 58, which runs substantially radially in relation to the pivot axis 22, and the pivot bearing body 14 is provided with a set of receptacles 60a, 60b and 60c with which the rotation-blocking bodies 54a, 54b and 54c are configured to be brought into engagement in the working position A.

For the purpose of suitably moving and positioning the rotation-blocking bodies 54 in the guide direction 58, the actuation body 52 is provided with a set, corresponding to the number of rotation-blocking bodies 54, of retraction receptacles 62a, 62b and 62c that correspond to the number of rotation-blocking bodies 54—for example three in total—and three pressure faces 66a, 66b and 66c that adjoin the retraction receptacles 62a, 62b and 62c in a direction of revolution 64 and take the form of wedge faces acting radially in relation to the pivot axis 22, wherein, in their release position, the rotation-blocking bodies 54 can penetrate far enough into the retraction receptacles 62a, 62b, 62c (FIG. 8) for them no longer to project beyond the outer face 46 of the guide sleeve 44, and wherein the pressure faces 66a, 66b, 66c each extend, from a radially inward starting region 68a, 68b and 68c that directly adjoins the respective retraction receptacle 62, increasingly radially outward in relation to the pivot axis 22 as their extent in the direction of revolution 64 increases, as far as a respective radially outward end region 70*a*, 70*b* and 70*c* and thus, when there is a rotary movement of the actuation body 52, act as wedge faces on the rotation-blocking bodies 54 in order to move them into their rotation-blocking position.

Preferably in this case, the pressure faces 66 extend in the manner of spiral or involute segments in relation to the pivot axis 22.

Figure 8:
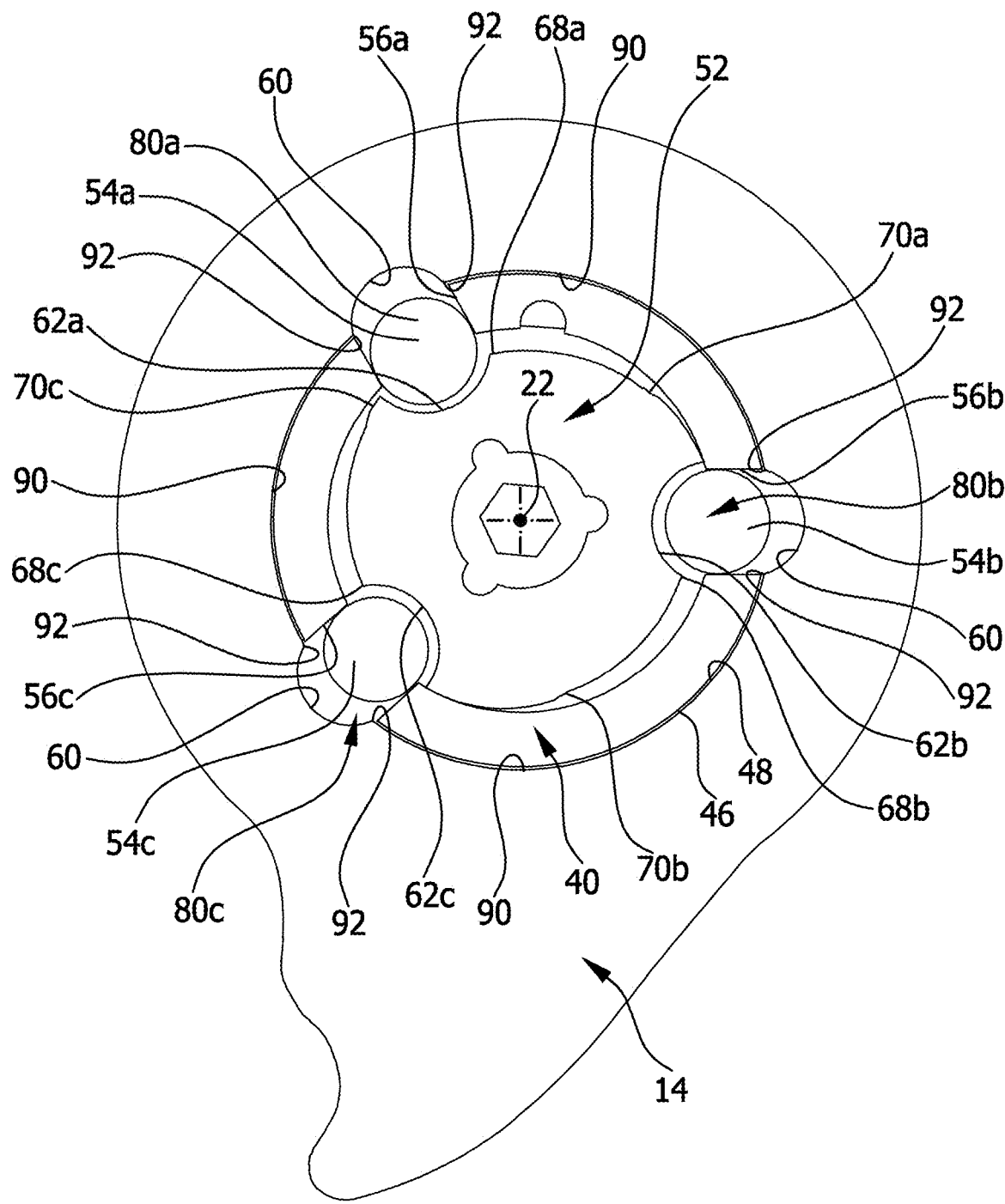
FIG. 8 shows an illustration of a section similar to FIG. 7, in the release position, with the actuation body rotated to the maximum extent.

In order either to keep the rotation-blocking bodies 54 in their rotation-blocking position as a result of their being urged by the pressure faces 66 between the starting region 68 and the end region 70, or to allow them to penetrate into the retraction receptacles 62 in the release position, the actuation body 52 is likewise rotatable about the pivot axis 22, in particular coaxially thereto, such that either the set of retraction receptacles 62*a*, 62*b* and 62*c* faces the rotation-blocking bodies 54 and—as illustrated in FIG. 8—in its inactive position or release position allows these to penetrate into the retraction receptacles 62 in the radial direction toward the pivot axis 22 during transfer, in order to enable the respective rotation-blocking bodies 54 to come out of the receptacles 60 and, together with the pivot bearing body 14, to release them for rotation about the pivot axis 22 in relation to the guide body 40, such that the pivot bearing body 14 and with it the ball neck 10 is freely and unimpededly rotatable in relation to the guide sleeve 44—as illustrated in FIG. 8—in which case the rotation-blocking bodies 54 do not extend beyond the outer face 46 of the guide sleeve 44.

Rotating the actuation body 52 in a direction of rotation 72 in opposition to the direction of revolution 64 when the rotation-blocking bodies 54 are seated in the retraction receptacles 62 has the effect that the rotation-blocking bodies 54 are moved out of the retraction receptacles 62 and initially, in the active position or rotation-blocking position of the actuation body 52, lie on the starting regions 68 of the pressure faces 66 but in so doing penetrate for example into the receptacles 60 and hence, in their rotation-blocking position, prevent the pivot bearing body 14 from being able to rotate freely in relation to the guide body 40.

If the actuation body 52 is rotated further in the direction of rotation 72, in opposition to the direction of revolution 64, then regions of the pressure faces 66 that lie further and further radially outward in relation to the pivot axis 22 act on the rotation-blocking bodies 54, and thus, in the working position A of the ball neck 10, push the rotation-blocking bodies 54 further and further into the receptacles 60*a*, 60*b* and 60*c* (FIG. 7), in order in this way to achieve substantially play-free Fixing of the pivot bearing body 14 in relation to the guide body 40, in this case in relation to the guide sleeve 44.

Figure 7:
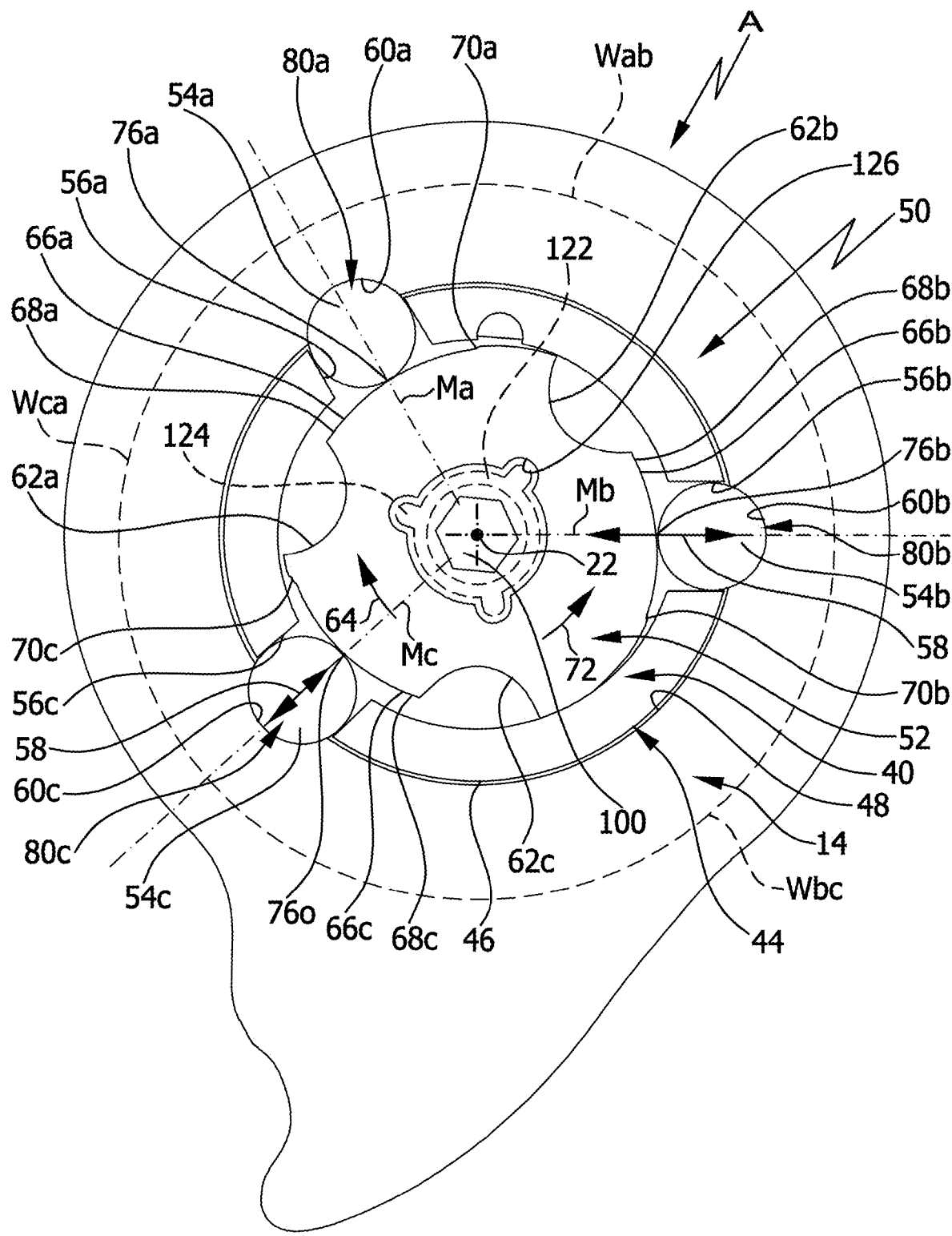
FIG. 7 shows a section along the line 7-7 in FIG. 6, in the working position.

In the rotation-blocking position of the rotation-blocking bodies 54, the actuation body 52 is in its active position in such a way that—as illustrated in FIG. 7—the rotation-blocking bodies 54 lie approximately on central regions 76, located between the starting regions 68 and the end regions 70, of the pressure faces 66 and are urged thereby.

In order to enable the actuation body 52 to urge each of the three rotation-blocking bodies 54 respectively in optimum manner, in the active position it is provided for the actuation body 52 to undergo centering corresponding to the position of the rotation-blocking bodies 54. In particular, the actuation body 52 is mounted in the guide sleeve 44 such that, because of the radial play, the actuation body 52 can center itself relatively within the guide body 40 in a manner corresponding to the position of the rotation-blocking bodies 54 that results from manufacturing tolerances, wherein the self-centering of the actuation body 52 may differ slightly from a coaxial arrangement in relation to the geometric pivot axis 22.

Because of the self-centering, the rotation-blocking bodies 54*a*, 54*b* and 54*c* act on the receptacles 60*a*, 60*b* and 60*c* in the respective guide direction 58*a*, 58*b* and 58*c* with forces of approximately equal size, with the result that the reaction forces acting on the actuation body 52 are also of approximately equal size.

Preferably, the rotation-blocking bodies 54 take the form of balls, which thus abut on one side against the actuation body 52 and on the other also against the receptacles 60.

Thus, the actuation body 52 is mounted in relation to the pivot axis 22 such that it is only rotatable with play, and this is primarily of relevance when the actuation body 52 keeps the rotation-blocking bodies 54 in a release position in which the rotation-blocking bodies 54 penetrate into the retraction receptacles 62 of the actuation body 52.

In order to cause the actuation body 52 always to move in the direction of rotation 72 in the absence of any external action, wherein the rotation-blocking bodies 54 move in the direction of the rotation-blocking position, the actuation body 52 is urged by a torsion spring 114 (FIG. 6) that on the one hand acts on the actuation body 52 and on the other is supported radially outward against the guide body 40.

The torsion spring 114 also has the effect that the actuation body 52 presses the rotation-blocking bodies 54 into the receptacles 60 in a manner urged by force, and in this way the pivot bearing body 14 is fixed without play, the absence of play being maintained even in the event of the geometry of the receptacles 60 changing under operational load as a result of a further rotation of the actuation body 52 in the direction of rotation 72.

The guide receptacles 56—of which there are for example three—and the rotation-blocking bodies 54 arranged therein, and the retraction receptacles 62 respectively associated with these rotation-blocking bodies 54 and having the pressure faces 66 adjoining these in the actuation body 52, respectively form three rotation-blocking units 80, and these are arranged around the pivot axis 22 at mutually unequal angular spacings Wab, Wbc, Wca (in relation to the respective center axis Ma, Mb, Mc), as a result of which—in relation to the pivot axis 22 as the axis of rotation—a rotation-blocking configuration of the rotation-blocking units 80 results in a congruent arrangement of the rotation-blocking units 80 only in the event of rotation of the rotation-blocking configuration about 360°.

For example, the angular spacing Wab=120°, the angular spacing Wbc=137°, and the angular spacing Wca=103°— that is to say that there is a deviation from equal angular spacings of 17°.

However, if there are for example three rotation-blocking units, there are also in particular deviations from equal angular spacings of up to 30° or more possible, with the result that angular spacings of for example Wab=120°, Wbc=150° and Wca=90° are possible.

Similarly, the receptacles 60 are arranged relative to one another, in relation to the pivot axis 22, in a receptacle configuration having the same angular spacings in relation to one another that, in relation to the pivot axis 22, likewise result in a congruent arrangement of the respective receptacle configuration only in the event of rotation about 360° such that in the working position this is congruent with the rotation-blocking configuration, with the result that in the working position A a respective rotation-blocking body 54 of one of the rotation-blocking units 80 is opposite one of the receptacles 60 and can come into engagement therewith in the rotation-blocking position, as illustrated in FIG. 7, as a result of which the pivot bearing body 14 is fixed such that it cannot rotate in relation to the pivot bearing unit 20 (FIG. 7).

However, if in the working position A the actuation body 52 moves into the release position, in opposition to the force action of the torsion spring 114—as described below—then each of the rotation-blocking bodies 54 of the respective rotation-blocking unit 80 is able to penetrate into the retraction receptacle 62 associated therewith and to come out of the respective receptacle 60, such that the pivot bearing body 14 is pivotal out of the working position about the pivot axis 22 (FIG. 8).

As soon as the pivot bearing body 14 has come out of the working position A (FIG. 9), it Is no longer possible for all of the rotation-blocking units 80 arranged in the rotation-blocking configuration in relation to the pivot axis 22 to come into engagement with all of the receptacles 60 arranged in the receptacle configuration, with the result that when the actuation body 52 is urged in the direction of rotation 72 it is no longer possible for all of the rotation-blocking bodies 54 that are seated in the retraction receptacles 62 to come into engagement with all of the receptacles 60, since, although the rotation-blocking bodies 54 can indeed be urged in the direction of the pivot bearing body 14 by the actuation body 52 that is urged in the direction of rotation 72 by the torsion spring 114, in particular by the concave root faces of the retraction receptacles 62, which run obliquely relative to the guide direction 58, nonetheless in any of the rotary positions of the pivot bearing body 14 that are outside the working position A it is never the case that all of the rotation-blocking bodies 54 are each opposite one receptacle 60 out of all of receptacles 60, and so it is always the case that at least one of the rotation-blocking bodies 54 is blocked by one of the blocking faces 90 that runs between the receptacles 60 and in the simplest case is formed by the cylindrical inner face 48 of the pivot bearing body 14, and as a result prevents rotation of the actuation body 52, brought about by the torsion spring 114, in the direction of rotation 72, with the result that even if the torsion spring 114 acts in the direction of rotation 72 the actuation body 52 is kept in the release position in all the pivotal positions of the pivot bearing body 14 outside the working position A, and consequently can only transfer into the rotation-blocking position again once the working position A is reached.

Preferably, the deviation of the rotation-blocking configuration of the rotation-blocking unit 80 and the receptacle configuration of the receptacles 60 from a symmetrical arrangement is sufficiently great that, when one of the rotation-blocking units 80 is opposite one of the receptacles 60 such that the rotation-blocking body 54 could come into engagement with this receptacle 60, at least one—or preferably at least two—rotation-blocking units 80 are offset from the closest receptacle 60 in the direction of rotation far enough for a point of contact of the rotation-blocking body 54 associated with this rotation-blocking unit 80 already to lie on one of the blocking faces 90 and not to be able to come to lie in the region of one of the receptacles 60, with the result that reliable blocking of the actuation body 52 is ensured by the blocking faces 90 that are active in the release position, in particular if the actuation body 52 is urged in the direction of rotation 72 by the torsion spring 114.

Figure 9:
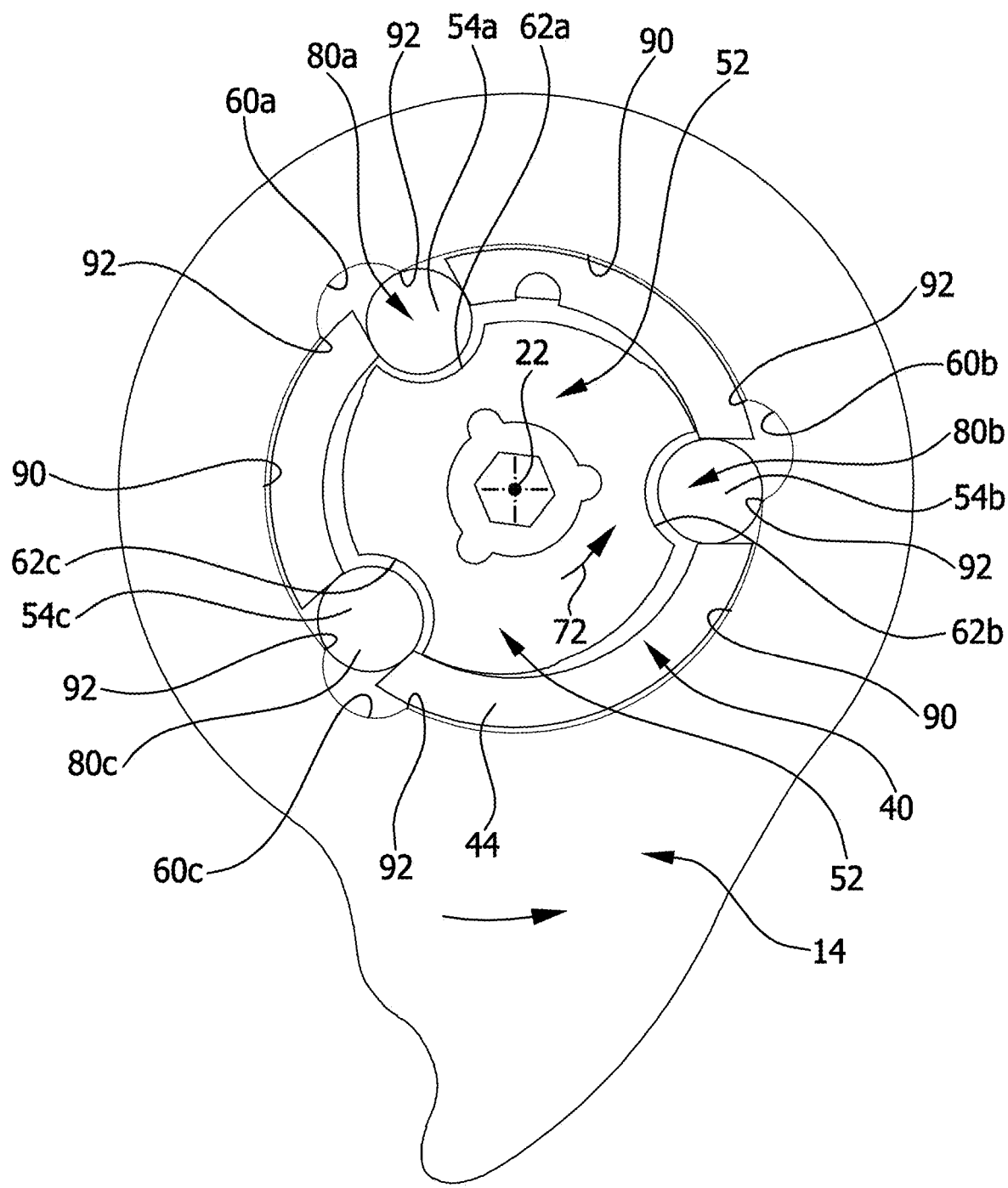
FIG. 9 shows an illustration similar to FIG. 8, with the pivot bearing body pivoted slightly out of the working position, with the actuation body rotated to the maximum extent.
Figure 10:
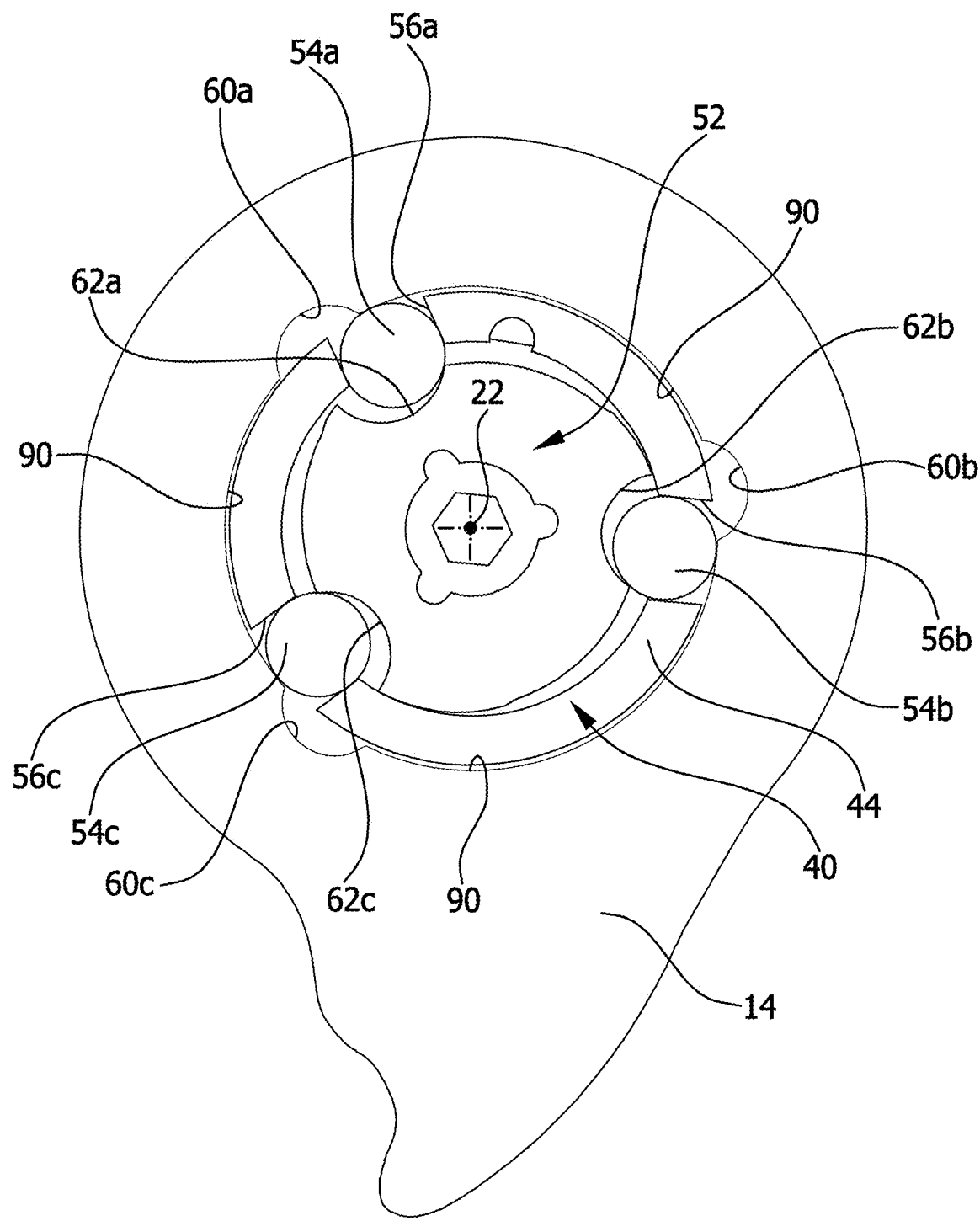
FIG. 10 shows an illustration similar to FIG. 8, with the actuation body under the action of the torsion spring.

If the actuation body 52 is acted on in a direction of rotation 64 in opposition to the action of the torsion spring 114 and rotated to the maximum extent, then, in all the pivotal positions of the pivot bearing body 14, the rotation-blocking bodies 54 lie between the respective blocking face 90 and the retraction receptacles 62 with play, as illustrated in FIG. 9.

If, however, the action of the torsion spring 114 in the direction of rotation 72 is dominant, then, even in the event of pivoting from the working position A to the rest position R, the conditions in the respective pivotal positions of the pivot bearing body 14 are those illustrated in FIGS. 10 to 14.

Figure 12:
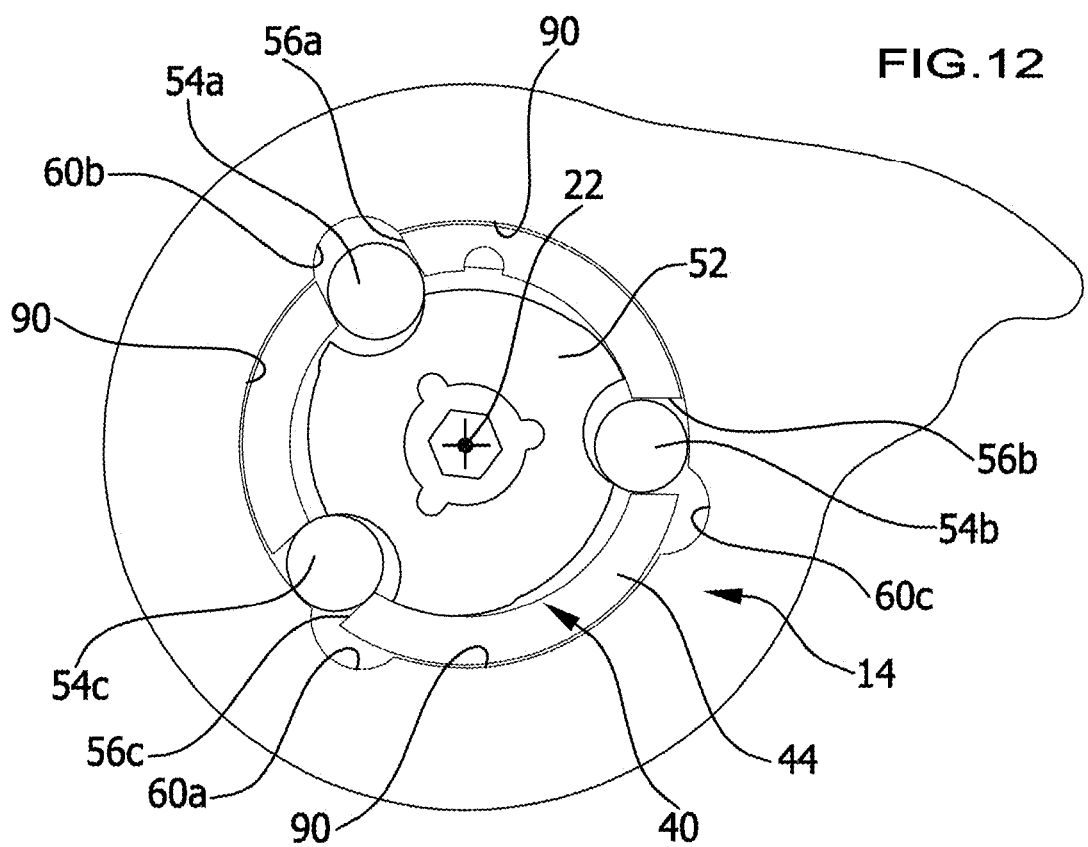
FIG. 12 shows an illustration similar to FIG. 8, of a pivotal position of the pivot bearing body as the pivotal movement increases in the direction of the rest position.
Figure 11:
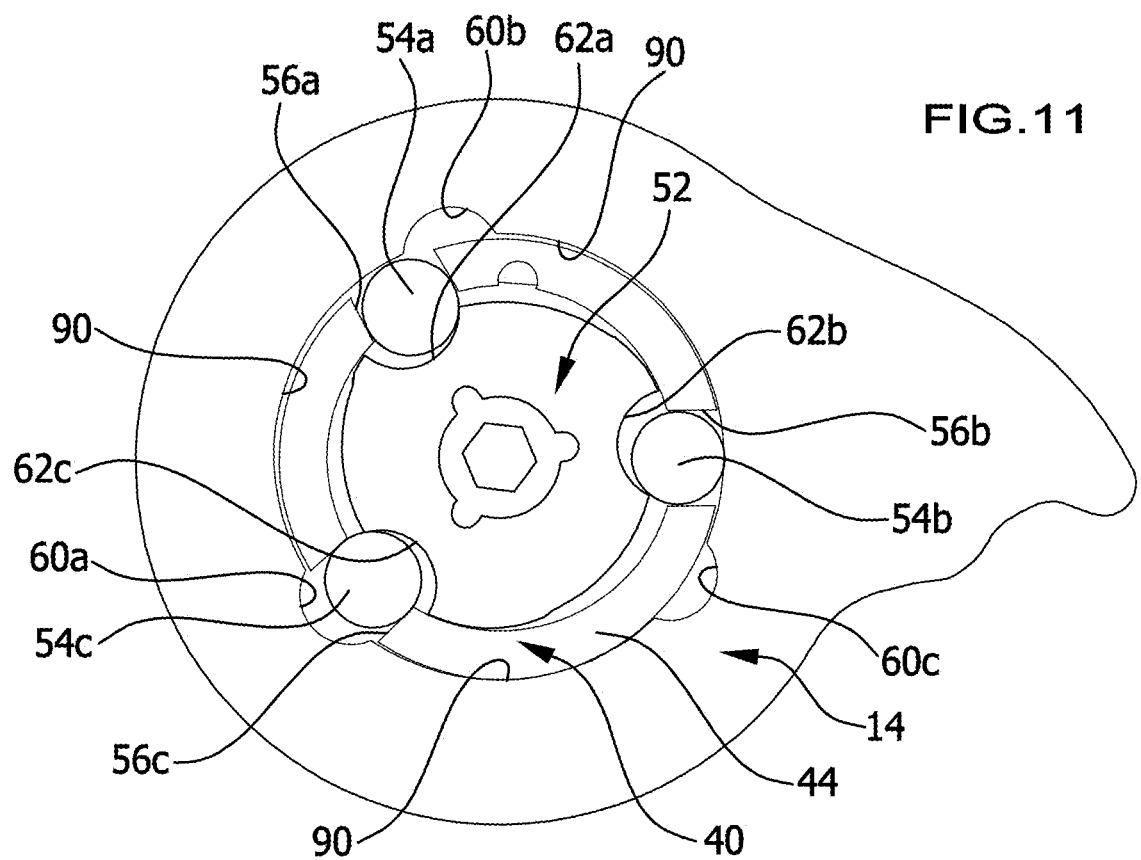
FIG. 11 shows an illustration similar to FIG. 8, of a pivotal position of the pivot bearing body as the pivotal movement increases in the direction of the rest position.
Figure 13:
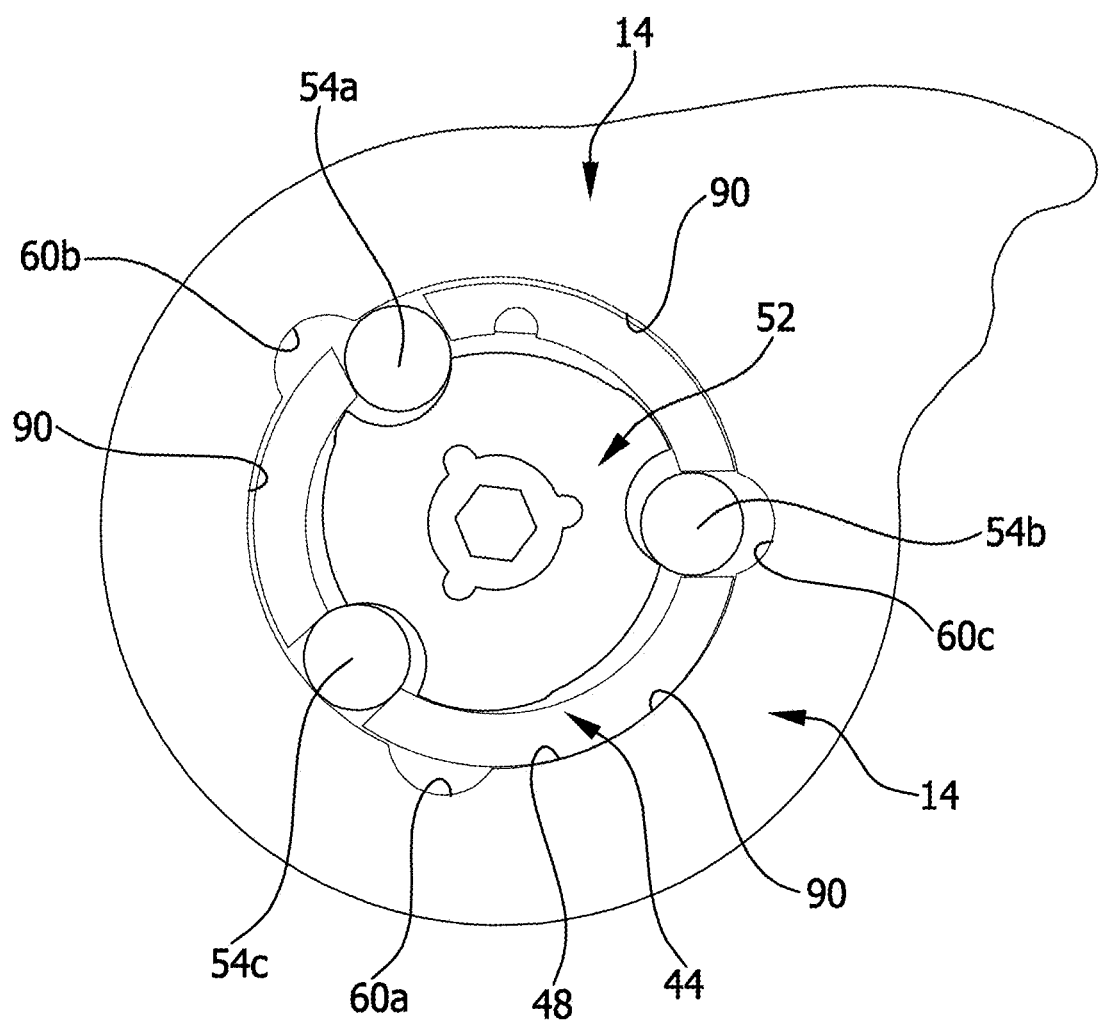
FIG. 13 shows an illustration similar to FIG. 8, of a pivotal position of the pivot bearing body as the pivotal movement increases in the direction of the rest position.

FIGS. 9 to 14 all show that the actuation body 52 is kept in the release position in each of the pivotal positions of the pivot bearing body 14 by at least two rotation-blocking bodies 54 that abut against one of the blocking faces 90, and prevent one of the rotation-blocking bodies 54—for example the rotation-blocking body 54c in FIG. 11, the rotation-blocking body 54a in FIG. 12 and the rotation-blocking body 54b in FIG. 13—from being able to engage in the receptacle 60 that is respectively aligned therewith.

Figure 14:
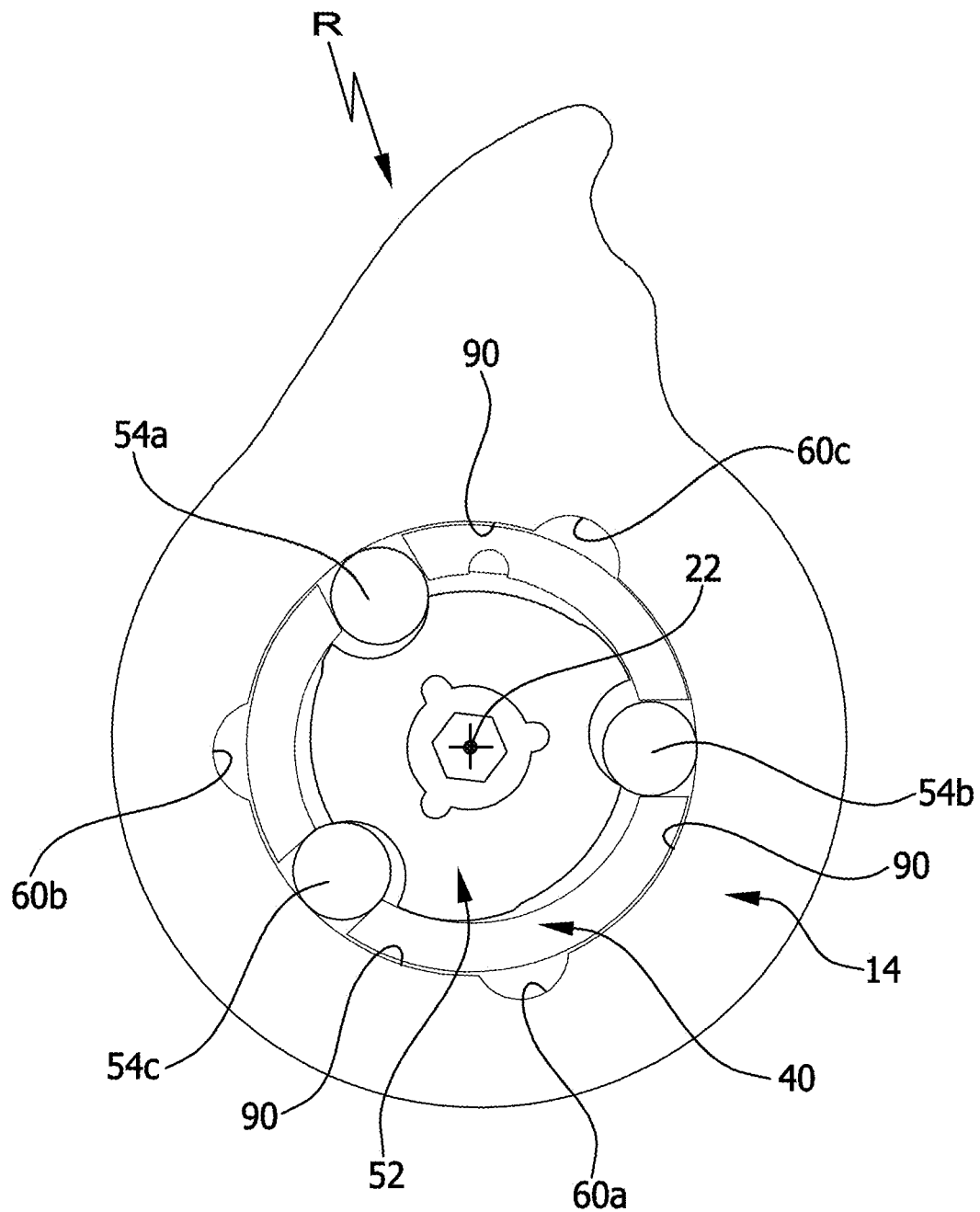
FIG. 14 shows an Illustration similar to FIG. 7, in the rest position.

In each case, the conditions according to FIGS. 9 to 14 are present when pivoting from the rest position R (FIG. 14) into the working position A, wherein because the rotation-blocking bodies 54 abut against the blocking faces 90 according to FIG. 9 during pivoting back from the rest position R into the working position A, in the sequence from FIG. 14 to FIG. 9, the rotation-blocking bodies 54 slide, with little noise development from the blocking faces 90 over each other, directly and in particular continuously against these adjoining opening edges 92 of the receptacles 60 and into the receptacles 60, and are transferred into the rotation-blocking position according to FIG. 7.

By means of a portion that forms a receptacle 102 for the actuation body 52, the guide sleeve 44 preferably extends between the flange 42 and a flange 104 that terminates the guide sleeve 44, extends radially in relation to the pivot axis 22, and is preferably integrally formed in one piece with the guide sleeve 44 and delimits the receptacle 102 for the actuation body 52, with the result that the actuation body 52 is guided, radially in relation to the pivot axis 22, by the receptacle 102 in the guide sleeve 44 and is guided axially in the direction of the pivot axis 22 by abutting against an inner side 108 of the flange 104.

Further, the flange 104 also has a receptacle 106 that is coaxial in relation to the pivot axis 22 and into which there is inserted, in particular screwed, an insert 110 through which a pivotal drive shaft 100 passes, wherein the insert 110 is seated in the receptacle 106.

On an opposite side of the receptacle 102 for the actuation body 52 to the flange 104, the guide sleeve 44 forms, for example by means of a portion passing through the flange 42, a torsion spring receptacle 112 in which there is arranged, adjoining the actuation body 52, the torsion spring 114, which is fixed on the one hand by means of an outer end in the torsion spring receptacle 112 and is connected by means of an inner end to a drive sleeve 122, which is coupled to the actuation body 52 such that it cannot rotate in relation thereto.

Figure 6:
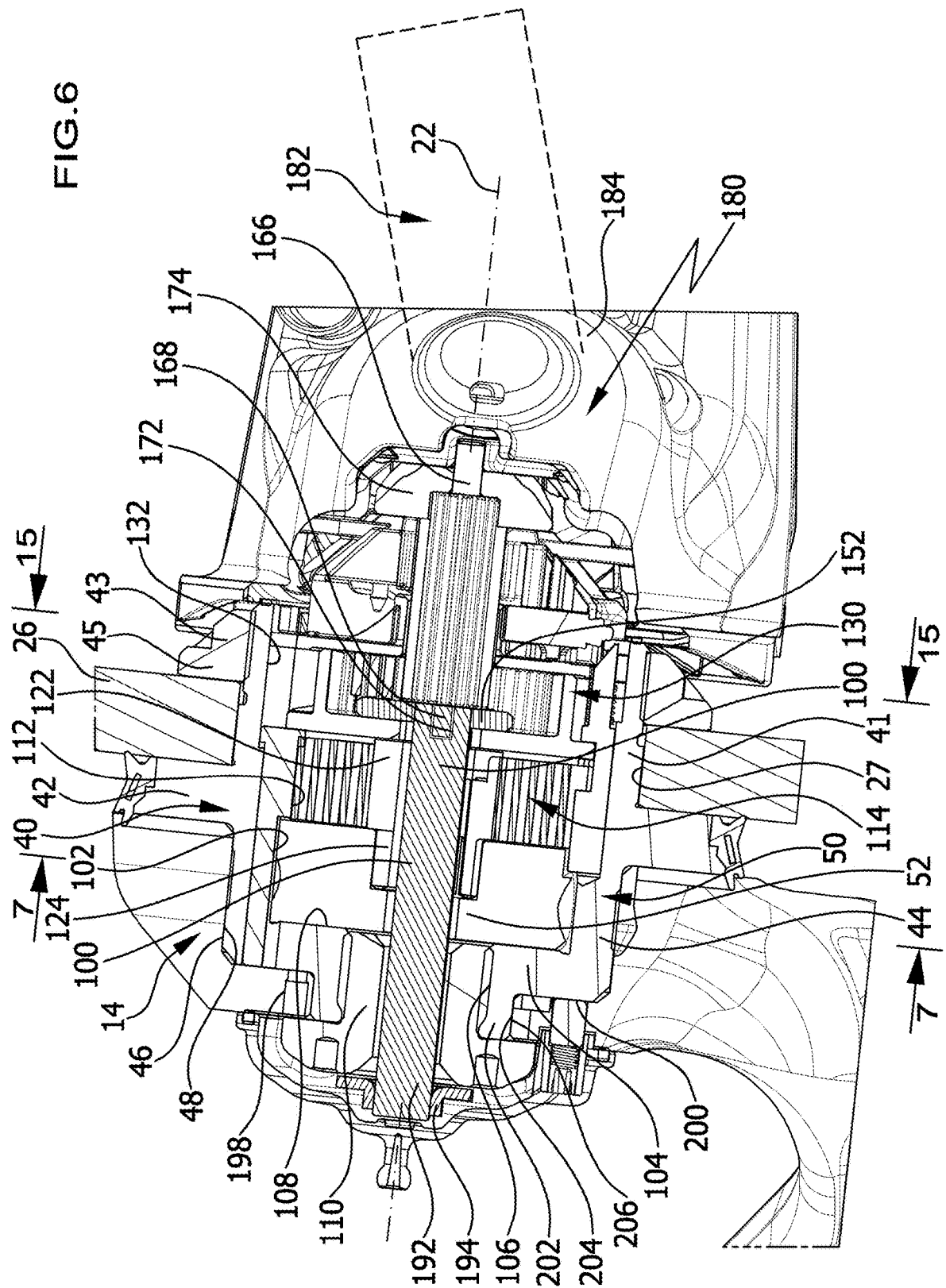
FIG. 6 shows an illustration of a section along the line 6-6 in FIG. 3.
Figure 16:
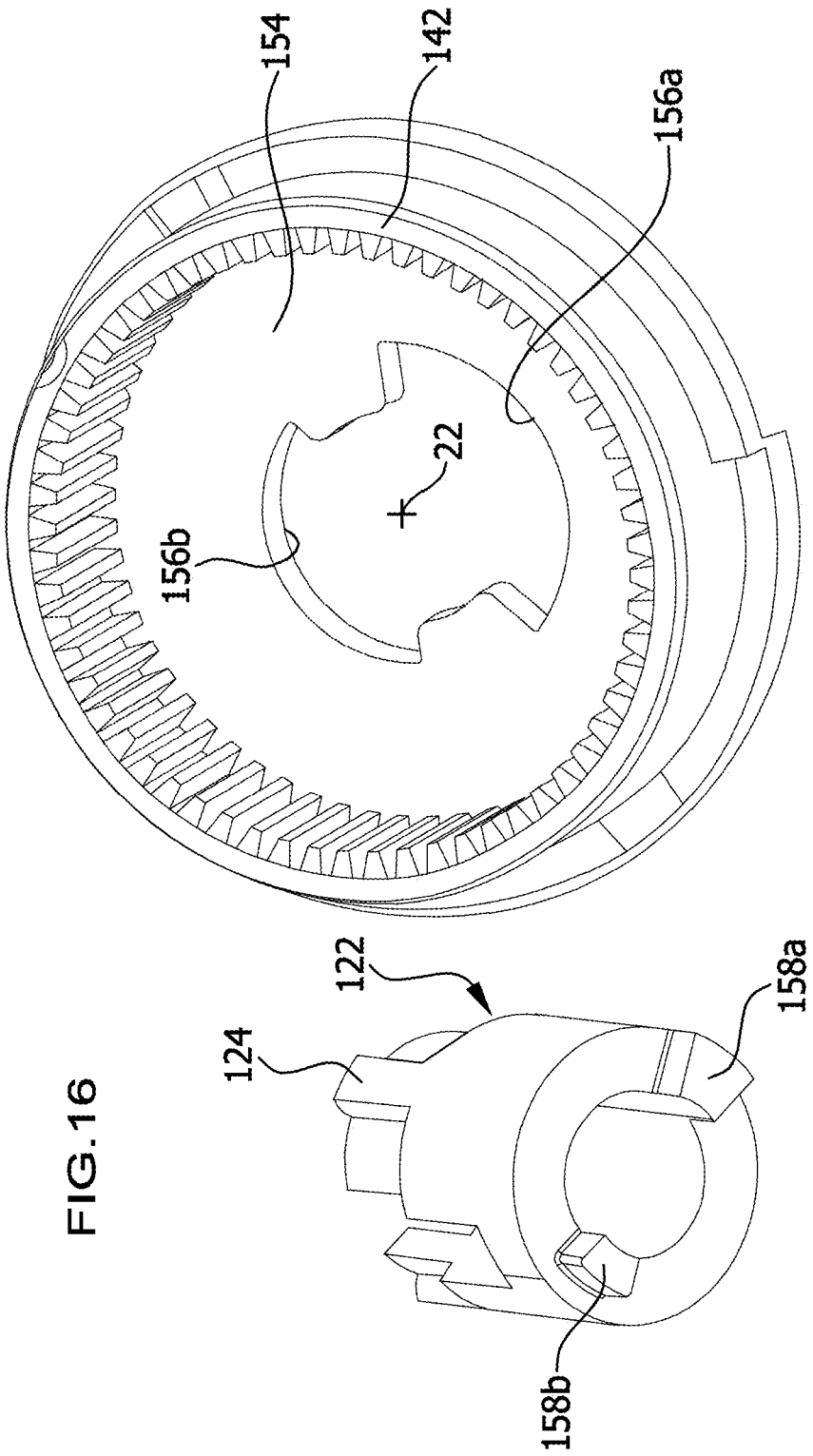
FIG. 16 shows a perspective illustration of a ring gear and a drive sleeve that cooperates therewith.

For this purpose, and as illustrated in FIGS. 6, 7 and 16, the drive sleeve 122 is provided for example with prolonged portions 124 that engage in corresponding recesses 126 in the actuation body 52 for the purpose of making a positively engaging connection.

Because the torsion spring 114 acts on the drive sleeve 122, which is coupled to the actuation body 52 such that it cannot rotate in relation thereto, as a result of the torsion spring 114 acting on the drive sleeve 122 the actuation body 52 is driven in the direction of rotation 72, such that the actuation body 52, while the torsion spring 114 acts unimpededly on the drive sleeve 122, is always urged in the direction of rotation 72, with the result that the actuation body 52 tends to move the rotation-blocking bodies 54 in a manner urged by force in the guide direction 58, radially outward away from the pivot axis 22, wherein this movement is prevented by the blocking faces 90 in all the pivotal positions of the pivot bearing body 14 that are provided with the exception of the working position A, and consequently it is only in the working position A that the rotation-blocking bodies 54 are pushed into the receptacles 60 and thus the pivot bearing body 14 is fixed such that it cannot rotate in relation to the guide sleeve 44 and in particular is fixed without play.

In order that the rotation-blocking bodies 54 can move into the release position, action on the actuation body 52 in opposition to the direction of rotation 72 and thus also in opposition to the action of the torsion spring 114 is required.

For this purpose, the drive sleeve 122 is configured to be driven by means of a planetary gear 130 that is designated 130 as a whole (FIG. 6) and is arranged in a gear receptacle 132 in the guide sleeve 44, in particular coaxially in relation to the pivot axis 22, and is arranged for example partly within the aperture 27 in the bearing plate 26 and preferably extends away from the aperture 27 in the bearing plate 26 on an opposite side to the flange 42.

The planetary gear 130 (FIG. 15) for its part comprises a ring gear 142 that is guided in the gear receptacle 132 and is provided with an internal toothing 144 with which planet wheels 146 engage by means of their external toothing 148.

Here, the planet wheels 146 are held rotatably on a planet wheel carrier 152 that for its part is connected to the pivotal drive shaft 100 such that it cannot rotate in relation thereto, with the result that the planet wheel carrier 152 forms an output drive of the planetary gear 130 for pivoting the ball neck 10.

Further—as illustrated in FIG. 16—the ring gear 142 comprises a flanged body 154 that is located between the planet carrier 152 and the torsion spring 114 and likewise extends in the direction of the pivotal drive shaft 100 and surrounds it, albeit being rotatable in relation thereto, and represents an output drive of the planetary gear 130 for actuating the rotation-blocking device 50.

As illustrated in FIG. 16, the flanged body 154 has arcuate drive slots 156*a*, 156*b*, which are arranged peripherally around the pivot axis 22, cooperate with drive fingers 158*a*, 158*b* of the drive sleeve 122 that engage therein, and yet take a form such that the difference between the angular range around the pivot axis 22 over which the drive slots 156 extend and the angular range around the pivot axis 22 over which the drive fingers 158 extend makes it possible to free movement of the drive sleeve 122 from the ring gear 142 in a manner that is explained in detail below.

Further, the planet wheels 146 engage by means of their external toothing 148 with an external toothing 164 of a sun wheel 162 of the planetary gear 130, the sun wheel 162 being seated on a drive shaft that is designated 166 as a whole, is arranged coaxially in relation to the pivot axis 22, and is mounted, for example by means of an end shaft journal 168 that engages in an end bore 172 in the pivotal drive shaft 100, in a manner freely rotatable in relation to the pivotal drive shaft 100 but coaxial therewith.

The drive shaft 166 carries, at a spacing from the planetary gear 130, a drive gearwheel 174, for example a bevel gearwheel, which is driven by an output gearwheel of a motorized drive unit 182 that comprises for example on the one hand a drive motor, preferably an electric motor, and on the other a step-down gear for driving the drive gearwheel.

The drive unit 182 is held for example on a cover body 184 that, from the bearing plate 26, engages over the drive shaft 166 with the drive gearwheel 174 and over the output gearwheel meshing therewith, and moreover forms a bearing for the drive shaft 166 on a side remote from the shaft journal 168.

In this way, the planetary gear 130 and the drive unit 182 form for example, among other things, an actuation device 180 for the rotation-blocking device 50.

The pivotal drive shaft 100, which is coupled to the planet carrier 152 such that it cannot rotate in relation thereto, passes through the flange 104 of the guide body 40—as described above—and is coupled, such that it cannot rotate in relation thereto, to a drive body 194, at an end 192 projecting beyond the insert 110 (FIGS. 17 and 18), wherein the drive body 194 has two drive arms 196*a* and 196*b* that extend in the direction of an end flange 198 of the pivot bearing body 14, which engages over an external region 200 of the flange 104 of the guide body 40, and in so doing the drive arms 196*a* and 196*b* engage positively in recesses therein in order to make a connection between the drive body 194 and the pivot bearing body 14 such that they cannot rotate in relation to one another.

Here, the end flange 198 engages over the flange 104 of the guide body 40 in the external region 200 and extends as far as a guide attachment 202 of the flange 104, wherein the end flange 198 embraces, for example by means of a radially inner cylinder face 204, an outer cylinder face 206 of the guide attachment 202 and for example abuts against it and as a result is likewise additionally guided on the guide attachment 202, coaxially in relation to the pivot axis 22.

Moreover, extending in the receptacle 106 in the guide attachment 202 there is a thread 212 into which there is fixed, in particular screwed, the insert 110, which partially engages, by means of an outer flange 214, over the end flange 198 in a radially inner region, with the result that the end flange 198 of the pivot bearing body 14 is guided axially non-displaceably between the flange 104 and the outer flange 214 of the insert 110 and hence is guided such that it is axially non-displaceable in relation to the guide body 40.

Figure 17:
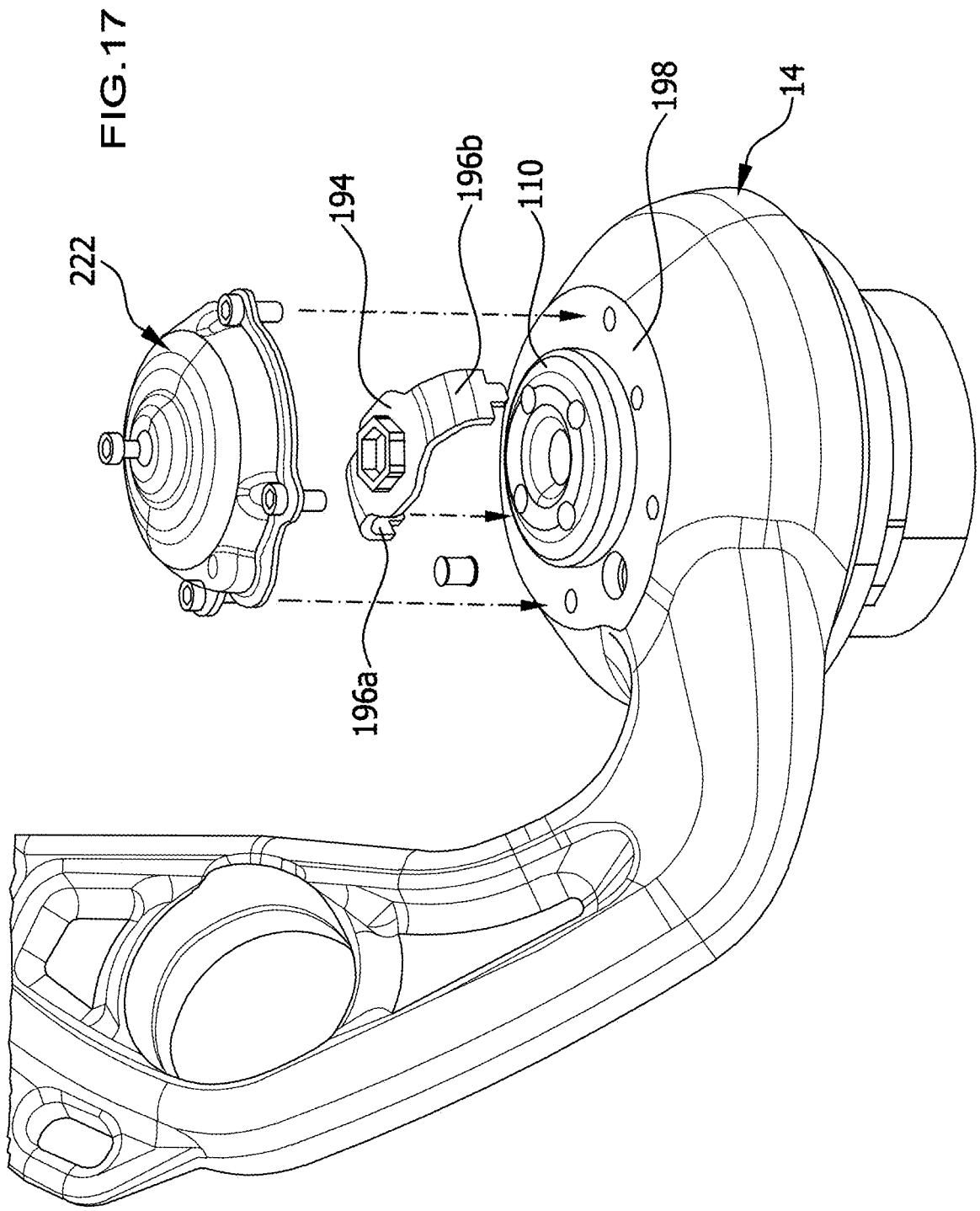
FIG. 17 shows a perspective exploded illustration of the pivot bearing body, with the cover.

Mounted on the end flange 198 such that it cannot rotate in relation thereto there is further a cover 222 that engages over the drive body 194 having the drive arms 196 and forms a bearing receptacle 224 for the end 192 of the guide shaft 100, with the result that the cover 222 forms with the pivot bearing body 14 a unit that is rotatable about the pivot axis 22 (FIG. 17).

Here, the cover 222 is seated on the end flange 198 and is fixed thereon such that it cannot rotate in relation thereto.

In the solution described above, only one set of receptacles 60 is provided for fixing the pivot bearing body 14 in the working position A such that it cannot rotate, whereas in the rest position R no fixing of the pivot bearing body 14 by the rotation-blocking device 50 is provided.

Figure 18:
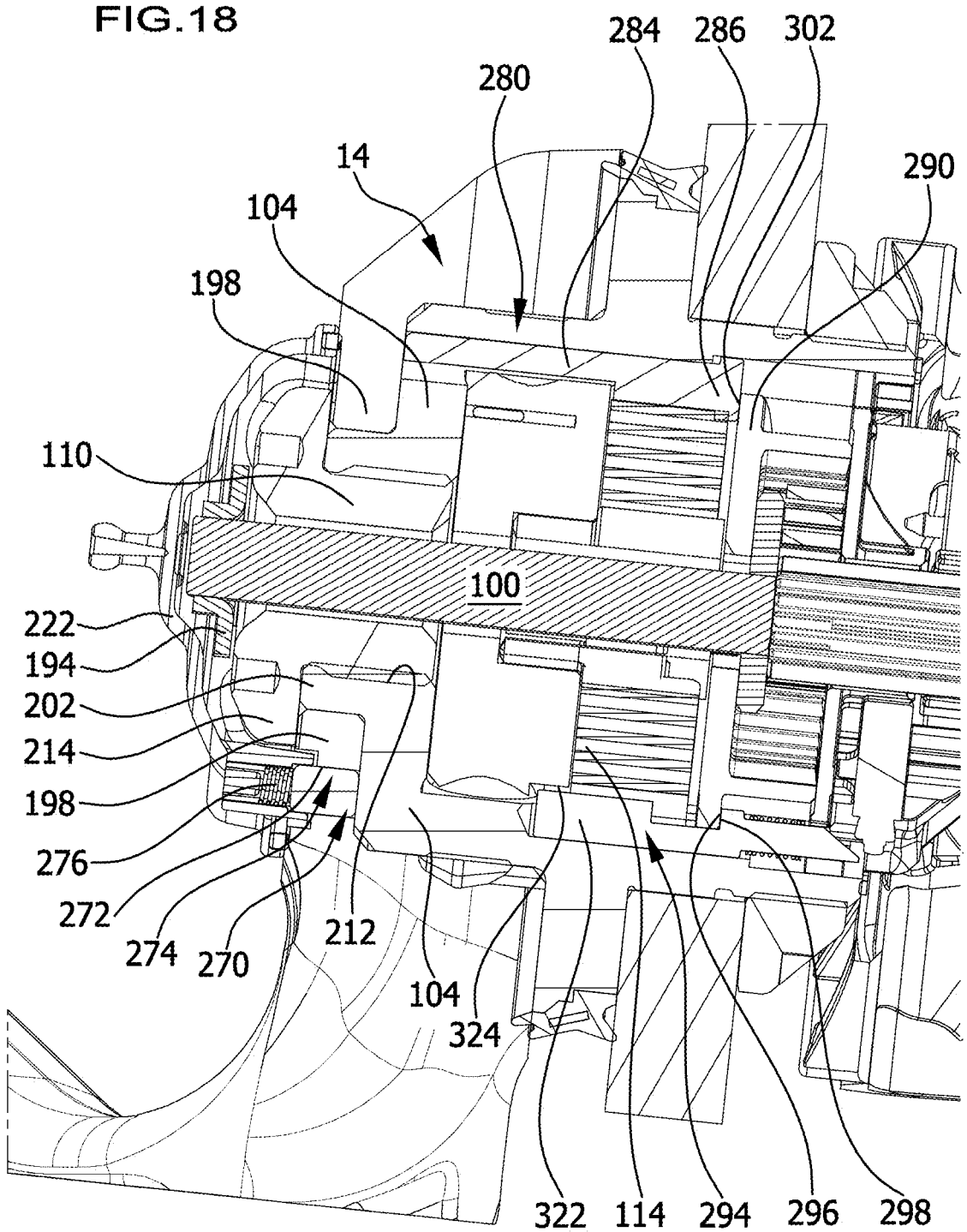
FIG. 18 shows an enlarged section from FIG. 6, in the working position.
Figure 19:
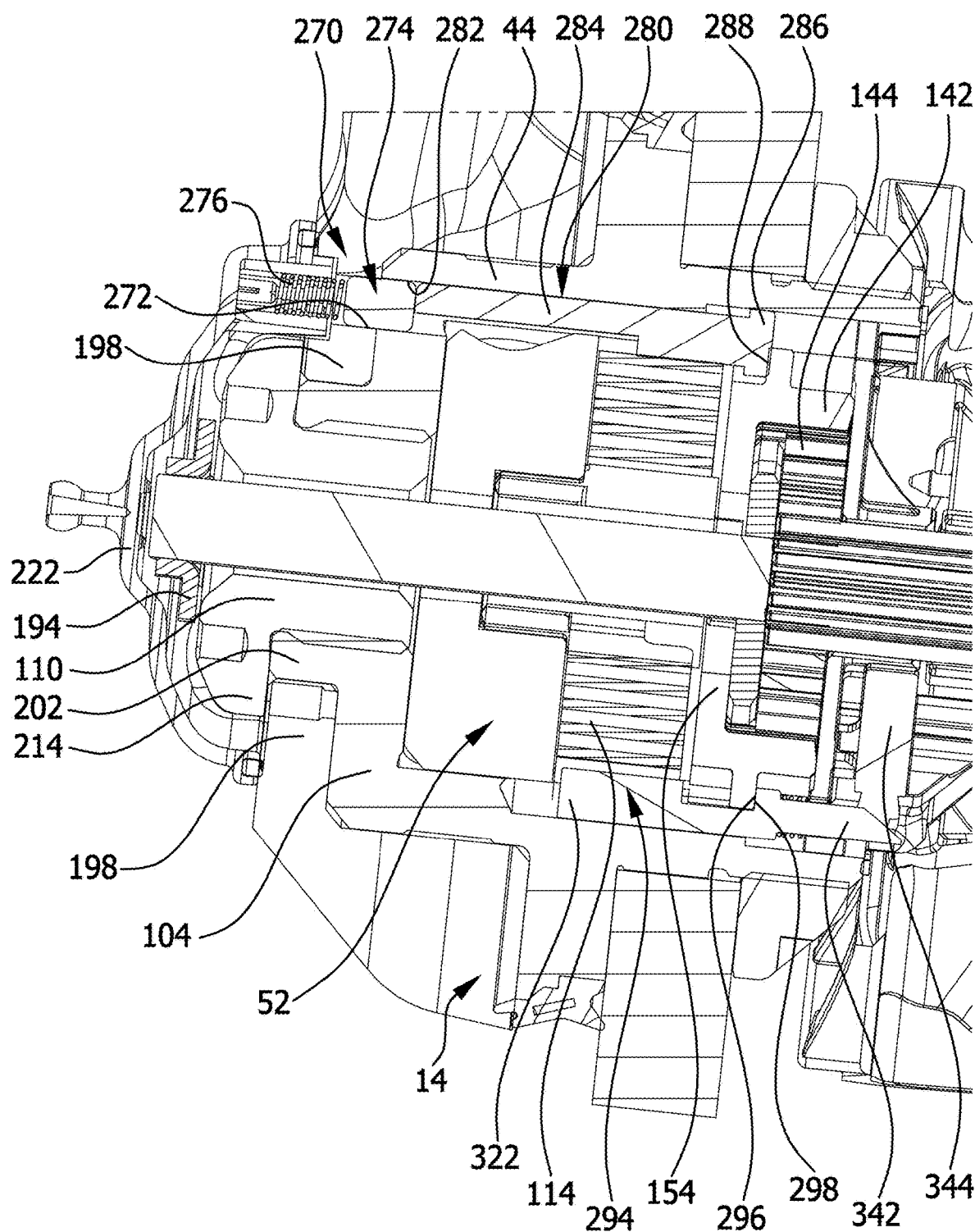
FIG. 19 shows an enlarged section, similar to FIG. 18, in the rest position.

Rather, for the purpose of fixing the pivot bearing body 14 in the rest position as illustrated in FIGS. 18 and 19, there is provided a rest position latching device 270, which has a latching body 274 that is provided in a bore 272 in the end flange 198 and is urged by the force of a spring element 276, arranged for example in the bore 272, in the direction of a latching direction parallel to the bore 272 and in the direction of the flange 104, wherein the latching body 274 abuts against the external region 200 of the flange 104 in all the rotary positions of the pivot bearing body 214 except the rest position R, wherein this external region 200 keeps the latching body 274 in its inactive position, and wherein the latching body 274 engages in a latching receptacle 282 taking the form of a latching bore in the flange 104 only when the pivot bearing body 14 is in the rest position (FIG. 19).

For this purpose, the spring element 276 urges the latching body 274 constantly in the direction of the flange side of the flange 104 that faces the end flange 198, and thus keeps it constantly in a latching-ready position, wherein engagement of the latching body 274 in the latching receptacle 282 and thus a transfer from the inactive position into the active latching position are only possible once the pivot bearing body 14 has reached the rotary position corresponding to the rest position R in relation to the guide body 40 of the pivot bearing unit 20.

In order to deactivate the rest position latching device 270—that is to say in order to move the latching body 274 out of the latching position—there is provided as a prolongation of the latching receptacle 282 in the guide sleeve 44 an actuation pin 284 that uses a sensor head 286 to scan a cam track 288 that is provided on the ring gear 142 and is arranged on a cam flange 290 running peripherally and radially outside of the internal toothing 144 on the ring gear 142, and thus forms a deactivation unit 280 for the rest position latching device 270.

FIGS. 20 to 26 show the cooperation of the rotary movement of the ring gear 142, starting from a rest position prevailing in the working position, on rotation in a direction of rotation 292, with the drive sleeve 122 for driving the actuation body 52 by means of the drive slots 156a and 156b, which are arranged in the flanged body 154 of the ring gear 142, with the drive fingers 158a, 158b engaging in these drive slots 156a, 156b, and with the sensor head 286 of the actuation pin 284 and a securing pin 294, which cooperates with a cam track 298, likewise formed by the cam flange 290, and scans this cam track 298 by means of a scanning surface 296 (FIG. 19), as explained in detail below.

In the starting position illustrated in FIG. 20, the sensor head 286 is located on a track portion 302 of the cam track, as a result of which the actuation pin 284 is in a position, as illustrated in FIG. 18, in which it would bring about release of the latching body 274 of the rest position latching device 270 if the pivot bearing body 14 were in the rest position. Since the pivot bearing body 14 is in the working position in FIG. 20, however, the actuation pin 284 has no effect.

If the ring gear 142 is now driven by means of the planetary gear 130, then the ring gear 142 rotates in the direction of rotation 292, and the sensor head 286 moves on a region 304 of the cam track 288 that is recessed in relation to the region 302 in the direction parallel to the pivot axis, with the result that it permits the actuation pin 284 to move if this actuation pin 284 is urged by the latching body 274, but this is not the case, with the result that the actuation pin 284 can also remain in the position predetermined by the region 302 of the cam track 288 (FIG. 21).

As can further be seen from FIG. 21a, rotation of the ring gear 142 with the cam flange 290 is initially performed without driving the drive sleeve 122, since the drive slots 156a, 156b permit relative rotation of this kind by the ring gear in relation to the drive fingers 158a, 158b without entraining them.

Here, the ring gear 142 can be further rotated until the drive slots 156a, 156b abut against the drive fingers 158a, 158b in the direction of rotation 292 (FIG. 22), wherein the sensor head 286 of the actuation pin 284 moves further in relation to the cam track 288, over the region 304 thereof, wherein the region 304 runs such that it is increasingly recessed in relation to the region 302. The fact that the drive sleeve 122 is entrained by entrainment of the drive fingers 158a, 158b about the pivot axis now also results in rotation of the actuation body 52 in addition until—as illustrated in FIG. 22—the rotation-blocking bodies 54 can penetrate into the retraction receptacles 62 associated therewith and thus reach the release position (FIG. 23), in which they lie in the retraction receptacles 62, with the result that the rotation-blocking device 50 is now in its release position and enables the rotary movement of the pivot bearing body 14, with the result that this can pivot out of the working position.

When the release position is reached, further rotary movement of the ring gear 142 in this direction is prevented by an abutment element 295 that comes into abutment against the securing pin 294, and, by enabling the pivotal movement of the pivot bearing body 14, there results pivoting thereof.

Coming out of the working position A causes the actuation body 52 to be blocked in the release position—as described above—by at least one rotation-blocking body 54 that abuts against the blocking faces 90, and moreover the rotary position of the drive sleeve 122 and thus also of its drive fingers 158a and 158b is also fixed in the rotary position that corresponds to the release position of the actuation body 52 and that likewise corresponds, according to FIG. 24, to the rotary position of the ring gear 142.

If the drive of the planetary gear 130 continues running in order to pivot the pivot bearing body 14 from the working position A into the rest position R, then the actuation body 52 is rotated into the release position to the maximum extent by the ring gear 142 such that the rotation-blocking bodies 54 can penetrate into the retraction receptacles 62 to the maximum depth, with the result that the rotation-blocking bodies 54 are located with play between the retraction receptacles and the blocking face 90, as illustrated in FIG. 9.

Depending on the counter-torque, which occurs when the pivot element 14 pivots, in relation to the torque of the torsion spring 114, during pivoting of the pivot bearing body 14 with the ball neck 10 from the working position A into the rest position R, the rotation-blocking body 52 remains in the release position, rotated to the maximum extent, or the torque of the torsion spring 114 rotates the actuation body 52 in the direction of rotation 72, with the result that, by means of the concave root faces running obliquely in relation to the respective guide direction 58, the retraction receptacles 62 act on the rotation-blocking bodies 54 and bring at least one of them into abutment against one of the blocking faces 90 until the rest position R is reached.

In any case, the ring gear 142 has no effect when the rest position R is reached, with the result that at the latest at this stage the torsion spring 114 rotates the actuation body 52 far enough in the direction of rotation 72 for the retraction receptacles 62 to act on the rotation-blocking bodies 54 and for the respective rotation-blocking bodies 54 that are in front of one of the blocking faces 90 to be brought into abutment against the blocking faces 90.

In this rotary position of the ring gear 142, the actuation pin 284 is able to move far enough for the latching body 274 of the rest position latching device 270 to be able to penetrate into the latching receptacle 282 and fix the pivot bearing body 14 in the rest position. However, this only happens once the pivot bearing body 214 has reached the rest position R—as illustrated in FIG. 13.

This position is illustrated in FIG. 24, and is achieved by the ring gear 142, starting from the position in FIG. 23, rotating further in the direction of rotation 292.

In this position, the actuation pin 284 is urged by the latching body 274, with the result that the sensor head 286 is moved far enough for it to abut against the region 306 of the cam track 288, enabling the actuation pin 284 to cause the latching body 274 to engage in the latching receptacle 282.

Once the rest position of the pivot bearing body 14 has been reached, the drive for the planetary gear 130 is also switched off, with the result that the ring gear 142 remains in the position illustrated in FIG. 24, and thus also, as a result of the sensor head 286 lying on the region 306 of the cam track 288, the actuation pin 284 maintains the rest position of the pivot bearing body 214 because the latching body 274 remains in the latching receptacle as a result of the action of the spring element 276 without the actuation pin 284 acting in opposition thereto.

If the pivot bearing body 214 is to be transferred from the rest position back into the working position then once again the planetary gear 130 is driven, but now in the opposite direction, such that the ring gear 242 also rotates in the opposite direction of rotation—in this case in the direction of rotation 312 (FIG. 25).

As a result, the cam track 288 moves in relation to the sensor head 286 of the actuation pin 284, and the sensor head 286 shifts along the cam track 288 and into the region 302, which has the result that, because the region 304 is inclined upward from the region 306, the actuation pin 284 is displaced in the direction of the end flange 198 and thus the latching body 274 is pushed out of the latching receptacle 282, with the result that the rest position latching device 270 is transferred into its released position and so the pivot bearing body 214 is no longer latched in the rest position.

In this case, however, the actuation body 52 of the rotation-blocking device 50 continues to be fixed in its release position, wherein release of blocking of the rotation-blocking body 52 in the release position, depending on the rotary position of the pivot bearing body 14, does not occur until the working position A is reached—as described.

Once the actuation body 52 has been moved out of its blocked position in the working position, the actuation body 52 performs a rotary movement as a result of the action of the torsion spring 114, such that the actuation body 52, together with the drive sleeve 122, likewise begins to rotate in the direction of rotation 312, and rotates in relation to the ring gear 142 as a result of the fact that the drive fingers 158 are movable in relation to the drive slots 156—as illustrated in FIG. 25—such that the drive fingers 158a, 158b begin to move in the direction of rotation 312 relative to the drive slots 156a and 156b, in order then to arrive back in the rotary position illustrated in FIG. 20, in the working position.

As also Illustrated in FIGS. 20 to 26, the cam flange 290 of the ring gear 142 carries not only the cam track 288 for actuating the actuation pin 284 but also the securing cam track 298 for actuating the securing pin 294, illustrated in FIGS. 18 and 19 and in FIGS. 20 to 26.

Here, the securing pin 294 has a securing body 322, which, for the purpose of securing the rotary position of the actuation body 52 in the rotation-blocking position, engages in a securing recess 324 that is formed such that the actuation body 52 is unable to come out of the rotation-blocking position, and thus the rotation-blocking position is secured in the working position—that is to say that locking of the pivot bearing body 214 in the working position is also secured.

The securing pin 294, which is movable by the securing cam track 298, forms, together with the securing body 322 and the securing recess 324, a securing device 330.

The securing cam track 298 is preferably arranged opposite the cam track 288 on the cam flange 290, and is shaped such that, from the securing position of the securing pin 294 (FIG. 20), in which the securing body 322 engages in the securing recess 324 (FIG. 20c), after the initial rotation of the ring gear 142 from the starting position in the direction of rotation 292, the securing cam track 298 already displaces the securing pin 294 far enough for the securing body 322 to come out of the securing recess 324 of the actuation body 52 (FIG. 21c) in order to enable the succeeding rotary movement of the actuation body 52.

For this purpose, the securing cam track 298 is provided with a securing region 332, which enables securing of the rotation-blocking position of the actuation body 52, and a non-securing region 334, which undoes securing of the movement of the rotation-blocking body 52, wherein these are connected to one another by a transfer region 336.

Moreover, the securing pin 294 is also provided with a prolonged portion 342, which depending on the position of the securing pin 294 actuates or does not actuate a sensing device 344, wherein for example the sensing device 344 is arranged such that in the unsecured position of the securing pin 294 it is actuated and in the securing position of the securing pin 294 it is not actuated, as can be seen from FIGS. 18 and 19.

The trailer hitch according to the invention operates as follows.

Starting from the working position, illustrated in FIGS. 1, 2, 3 and 6, and in FIG. 7, in which rotation of the pivot bearing body 14 relative to the guide body 40 is blocked in respect of a rotary movement 50 about the pivot axis 22 by the rotation-blocking device, in particular in that the actuation body 52 has moved the rotation-blocking bodies 54 in the guide direction 58 radially outward far enough away from the pivot axis 22 for them to engage in the receptacles 60 and hence to fix the pivot bearing body 14 such that rotation thereof relative to the guide body 40 is blocked, switching on of the drive unit has the effect that the drive gearwheel 174 is driven by the output gearwheel such that the drive shaft 166 drives the sun wheel 162.

This, for its part, drives the planet wheels 146, but because the pivot bearing body 14 is blocked in respect of a rotary movement about the pivot axis 22 by the rotation-blocking device 50, the planet wheels 146 are likewise blocked, with the result that the drive arms 196 of the drive body 194 cannot turn in relation to the abutment bodies 226 and 228, and consequently a rotary movement of the guide shaft 100, to which the planet carrier 152 is connected such that it cannot rotate in relation thereto, cannot take place either.

As a result, the ring gear 142 is driven such that it rotates in the direction of rotation 292, according to FIG. 20. Initially, this rotation of the ring gear 142 has the effect of actuating the securing device 320, wherein displacement of the securing pin 294 causes the securing body 322 to come out of the securing recess 324 of the actuation body 52 and to be transferred from the securing position into the unsecured position (FIG. 21). Further rotation of the ring gear 142 has the result that the cam track 288 no longer acts on the sensor head 286 and so permits movement thereof in the direction away from the flange 104, as illustrated in FIG. 21 and FIG. 22, with the result that the rest position latching device 270 is activated without rotation of the actuation body 52 of the rotation-blocking device 50 already taking place.

Then, as illustrated in FIGS. 23 to 24, the drive sleeve 122, which is connected to the actuation body 52 by the prolonged portions 124 such that it cannot rotate in relation thereto, is rotated by way of the drive slots 156 and the drive fingers 158.

As a result, the ring gear 142 rotates the actuation body 52 in the direction of its release position, far enough out of the rotation-blocking position for the release position to be reached.

Since, when the release position of the actuation body 52 is reached, rotary movement of the pivot bearing body 14 is possible and moreover the rotary movement of the actuation body 52 in the direction of rotation 72 is prevented by the action of the ring gear 142, the ring gear 142 of the planetary gear 130 is stationary while the planet carrier 146 now rotates, wherein the planet carrier 146 is able to pivot the pivot bearing body 14 about the pivot axis 22 in the direction of the rest position R by way of the pivotal drive shaft 100 and the drive body 194 with the drive arms 196.

When the rest position R is reached, the rest position latching device 270 becomes active, in particular because the latching body 274 is able to engage in the latching bore 282 and to displace the sensor body 254 in the direction of the cam track 288 by means of the actuation pin 294.

As a result, the pivot bearing body 14 is latched in the rotary position corresponding to the rest position R of the ball neck 10 by the rest position latching device 270.

In this rest position, the drive unit is now switched off.

If the ball neck 10 is to be pivoted back from the rest position R to the working position A, the drive unit is operated in the opposite direction of rotation.

Since it is not possible to pivot the pivot bearing body 214, because the rest position latching device 270 is active, the planetary gear 130 drives the ring gear 142 in the direction of rotation 312, wherein as illustrated in FIG. 25 the ring gear 142 acts on the actuation pin 294 by means of the cam track 288 such that the actuation pin 294 deactivates the rest position latching device 270.

Since it is not possible to turn the actuation body 52, because the blocking faces 90 are active, the planetary gear 130 brings about a rotary movement of the planet carrier 152, which drives the drive body 194 having the drive arms 196 by way of the pivotal drive shaft 100, and brings about pivoting of the pivot bearing body 14 with pivoting of the ball neck 10 in the direction of the working position A.

When the working position A is reached, blocking of the actuation body 52, for the purpose of moving in the direction of rotation 72 under the action of the torsion spring 114 in the direction of the rotation blocking position, is removed, in the manner described and as illustrated for example in FIG. 20, wherein the rotation-blocking bodies 54 are pushed outward into the receptacles 60 by the actuation body 52, radially in relation to the pivot axis 22, and thus in turn result in a blocking of rotation of the pivot bearing body 14 in relation to the guide body 40 (FIG. 26).

In this locked position of the pivot bearing body 14 in relation to the guide body 40, a rotary movement of the planet carrier 152 is for its part blocked, with the result that the ring gear 142 is rotated further, into the starting position illustrated in FIG. 20, in which the actuation body 52 can perform a further rotary movement in the direction of rotation 72 under the action of the torsion spring 114, with the result that the ring gear 142 in the working position A does not impede later adjustment by rotating the actuation body 52 further in the direction of rotation 72 under the action of the torsion spring 114.

Further, once the actuation body 52 has been transferred into the rotation-blocking position, the securing device 330 becomes active, with the result that the securing pin 294 engages by means of the securing body 322 in the securing recess 324 of the actuation body 52 and prevents it from being transferred into the release position.

The invention claimed is:

1. A trailer hitch, comprising a ball neck, which is movable between a working position and a rest position and has a pivot bearing body arranged at a first end and a coupling ball arranged at a second end, a pivot bearing unit, which is arranged fixed to a vehicle and by means of which the pivot bearing body is received such that it is pivotal for the purpose of performing a pivotal movement about a pivot axis between the working position and the rest position, and a rotation-blocking device that is active between the pivot bearing unit and the pivot bearing body and has on the one hand at least two rotation-blocking units, each of which has a rotation-blocking body that is guided in a manner movable in a guide direction by means of a guide receptacle in a guide body and is movable in the guide direction by a pressure face provided on an actuation body and running transversely to the guide direction, and on the other hand has at least two receptacles, wherein a movement of the actuation body in an actuation direction makes the rotation-blocking bodies of all the rotation-blocking units movable and urgeable in the guide direction, and wherein, in the working position, the rotation-blocking bodies of all the rotation-blocking units are configured to be brought into a rotation-blocking position by movement in the guide direction, and in this position each rotation-blocking body comes into engagement with a respective one of the receptacles in order to block a pivotal movement of the pivot bearing body about the pivot axis in relation to the guide body, and are configured to be brought into a release position, and in this position are disengaged from the respective receptacle and enable the pivotal movement of the pivot bearing body, blocking faces run between the receptacles against which the rotation-blocking bodies are configured to abut and from which the receptacles extend, the rotation-blocking units and the receptacles are arranged at angular spacings from one another around the pivot axis such that, in all the pivotal positions of the pivot bearing body that are provided, including the rest position and with the exception of the working position, the rotation-blocking body of at least one of the rotation-blocking units lies opposite one of the blocking faces, and, in particular if there is a force acting on the actuation body, the blocking face blocks movement of the actuation body in the actuation direction and consequently also blocks engagement, urged by force, of the rotation-blocking bodies of each of the rotation-blocking units in a respective one of the receptacles.

2. The trailer hitch as claimed in claim 1, wherein the blocking faces run facing the rotation-blocking bodies of the rotation-blocking units.

3. The trailer hitch as claimed in claim 1, wherein the blocking faces run around the pivot axis at a defined radius.

4. The trailer hitch as claimed in claim 1, wherein the blocking faces run as far as opening edges of the receptacles and merge into these.

5. The trailer hitch as claimed in claim 4, wherein the opening edges of the receptacles are located at the same radial spacing from the pivot axis as the blocking faces.

6. The trailer hitch as claimed in claim 1, wherein, in the event of a pivotal movement of the pivot bearing body in the direction of the working position, at least one of the rotation-blocking bodies of the rotation-blocking units abuts against one of the blocking faces, in particular abutting in a manner urged by force by the action of the actuation body.

7. The trailer hitch as claimed in claim 1, wherein, before reaching the working position, the rotation-blocking bodies abut against the blocking faces in a manner urged by force and then enter the receptacles such that they abut against opening edges of the receptacles in a manner urged by force.

8. The trailer hitch as claimed in claim 1, wherein the receptacles extend in the guide direction from the blocking faces, in particular with at least one component in the radial direction relative to the pivot axis.

9. The trailer hitch as claimed in claim 1, wherein the receptacles and the blocking faces are arranged facing the guide body.

10. The trailer hitch as claimed in claim 1, wherein the guide body is part of the pivot bearing unit arranged fixed to the vehicle.

11. The trailer hitch as claimed in claim 1, wherein all the guide receptacles for the rotation-blocking bodies of the rotation-blocking units are arranged in the guide body.

12. The trailer hitch as claimed in claim 1, wherein at least one component of the guide direction runs in the radial direction in relation to the pivot axis.

13. The trailer hitch as claimed in claim 1, wherein the guide body has a guide sleeve with guide receptacles for the rotation-blocking bodies of the rotation-blocking units, and wherein in particular the rotation-blocking bodies are guided by the guide body adjoining the pivot bearing body in the radial direction.

14. The trailer hitch as claimed in claim 1, wherein the guide body has a pivot bearing for the pivot bearing body.

15. The trailer hitch as claimed in claim 1, wherein the actuation body is guided such that it is movable in relation to the guide body.

16. The trailer hitch as claimed in claim 1, wherein the actuation body is arranged such that it is rotatable about the pivot axis and in particular has wedge faces extending over an angular range around the pivot axis and varying in the direction parallel to the guide direction, preferably combined with retraction receptacles.

17. The trailer hitch as claimed in claim 1, wherein the receptacles and the blocking faces are arranged on the pivot bearing body.

18. The trailer hitch as claimed in claim 1, wherein the actuation body is surrounded by the guide body, and wherein in particular the pivot bearing body embraces the guide body.

19. The trailer hitch as claimed in claim 1, wherein the rotation-blocking bodies are arranged around the actuation body.

20. The trailer hitch as claimed in claim 1, wherein the pivot bearing body forms an outer body outwardly surrounding the pivot bearing unit, wherein the outer body is arranged to be non-displaceable in the direction of the pivot axis in relation to the pivot bearing unit, and wherein in particular the pivot bearing body forms an outer body that outwardly surrounds at least one section of the rotation-blocking unit and that is arranged to be non-displaceable in the direction of the pivot axis in relation to the guide body.

21. The trailer hitch as claimed in claim 1, wherein the actuation body is urged in the direction of its rotation-blocking position by a resilient energy store.

22. The trailer hitch as claimed in claim 1, wherein the actuation body is movable from the rotation-blocking position into the release position by an actuation device.

23. The trailer hitch as claimed in claim 21, wherein the actuation body is movable by the actuation device in opposition to urging by the energy store.

24. The trailer hitch as claimed in claim 21, wherein, by means of the actuation device, the actuation body is rotatable in opposition to the direction of actuation brought about by the resilient energy store.

25. The trailer hitch as claimed in claim 1, wherein the actuation device has an output element that is coupled to the actuation body.

26. The trailer hitch as claimed in claim 25, wherein the output element and the actuation body are coupled to one another by way of an entraining coupling device.

27. The trailer hitch as claimed in claim 26, wherein the entraining coupling device has a free condition, with no entrainment, and an entraining condition.

28. The trailer hitch as claimed in claim 1, wherein the actuation device for the rotation-blocking device comprises a motorized drive unit.

29. The trailer hitch as claimed in claim 1, wherein the motorized drive unit is also provided as a pivotal drive for performing the pivotal movement of the pivot bearing body.

30. The trailer hitch as claimed in claim 1, wherein a first output element for driving the rotation-blocking device and a second output element for driving the pivotal movement of the pivot bearing body are coupled by an epicyclic gear.

31. The trailer hitch as claimed in claim 30, wherein the epicyclic gear is drivable using a single motorized drive unit.

32. The trailer hitch as claimed in claim 30, wherein the first output element of the epicyclic gear acts as a pivotal drive on the pivot bearing body, for the purpose of pivoting the ball neck between the working position and the rest position, and wherein the second output element of the epicyclic gear acts as a controller on the actuation body in order to move this from the rotation-blocking position into the release position.

33. The trailer hitch as claimed in claim 32, wherein the epicyclic gear allows alternation between the first output element for driving the rotation-blocking device and the second output element for driving the pivotal movement of the pivot bearing body.

34. The trailer hitch as claimed in claim 30, wherein dependent on whether the first output element or the second output element is inhibited, there occurs driving of the pivotal movement or of the rotation blocking device.

35. The trailer hitch as claimed in claim 30, wherein the epicyclic gear is arranged coaxially in relation to the pivot axis.

36. The trailer hitch as claimed in claim 30, wherein the epicyclic gear is arranged on a side of the actuation element that faces the motorized drive.

37. The trailer hitch as claimed in claim 30, wherein, as seen in the direction of the pivot axis, the epicyclic gear is driven on one side of the motorized drive unit and has an output drive for the actuation element on the opposite side.

38. The trailer hitch as claimed in claim 30, wherein the epicyclic gear is arranged, as seen in the direction of the pivot axis, between the motorized drive unit and the actuation element.

39. The trailer hitch as claimed in claim 30, wherein the epicyclic gear, the resilient energy store and the actuation element are arranged such that they succeed one another in the direction of the pivot axis.

40. The trailer hitch as claimed in claim 1, wherein the actuation body is blockable in its rotation-blocking position by a securing device.

41. The trailer hitch as claimed in claim 40, wherein the actuation body is blockable by the securing device to prevent its reaching its release position.

42. The trailer hitch as claimed in claim 1, wherein there is provided a rest position latching device that is independent of the rotation-blocking device and which, in an inactive position, allows movement of the pivot bearing body in relation to the pivot bearing unit and, in a latching position, fixes the pivot bearing body such that it cannot rotate in relation to the pivot bearing unit, and wherein there is provided a deactivation unit by means of which the rest position latching device is deactivated independently of the pivotal movement of the pivot bearing body.

43. The trailer hitch as claimed in claim 42, wherein, when the rotary position of the pivot bearing body that corresponds to the rest position is reached, the rest position latching device is transferred into the latching position automatically because of a spring element provided therein.

44. The trailer hitch as claimed in claim 42, wherein, in the event that the rest position latching device is not in the latching position, it is always in a latching-ready position.

45. The trailer hitch as claimed in claim 42, wherein the rest position latching device is configured to be deactivated by means of the deactivation unit, depending on a particular functional condition of the trailer hitch.

46. The trailer hitch as claimed in claim 45, wherein the rest position latching device is configured to be deactivated by means of the deactivation unit before pivoting of the pivot bearing body from the rest position into the working position.

47. The trailer hitch as claimed in claim 42, wherein the rest position latching device is configured to be deactivated by means of the deactivation unit by a drive unit that cooperates with the deactivation unit.

48. The trailer hitch as claimed in claim 42, wherein there is provided a branching gear, which is drivable by means of a drive element, has a first output element by means of which driving of the pivotal movement of the pivot bearing body with the ball neck is performed, and has a second output element that cooperates with the deactivation unit for the purpose of deactivating the rest position latching device.

49. The trailer hitch as claimed in claim 48, wherein the branching gear couples the drive element to the first output element or the second output element automatically.

50. The trailer hitch as claimed in claim 48, wherein the branching gear is an epicyclic gear, in particular a planetary gear.

51. The trailer hitch as claimed in claim 48, wherein the drive element of the branching gear is driven by means of the drive unit, which is in particular operated electrically.

52. The trailer hitch as claimed in claim 42, wherein the rest position latching device comprises a latching body that is arranged in the pivot bearing body or the pivot bearing unit, that is movable in a latching direction and that is configured to be brought into engagement with a latching receptacle arranged in the pivot bearing unit or the pivot bearing body.

53. The trailer hitch as claimed in claim 52, wherein the latching body that is movable in the latching direction is arranged in the pivot bearing body, and in that the latching receptacle is arranged in the pivot bearing unit.

54. The trailer hitch as claimed in claim 52, wherein the latching direction runs parallel to the pivot axis.

55. The trailer hitch as claimed in claim 52, wherein there is associated with the latching receptacle an actuation body of the deactivation unit that, when the deactivation unit is active, expels the latching body from the latching receptacle.

56. The trailer hitch as in claim 1, wherein the rotation-blocking units are for forming a rotation-blocking configuration and are arranged at angular spacings around the pivot axis, the receptacles are for forming a receptacle configuration and are arranged at the same angular spacings around the pivot axis as the rotation-blocking units, in the working position, the rotation-blocking configuration and the receptacle configuration are mutually congruent such that the rotation-blocking bodies can engage in the receptacles, and the angular spacings between the rotation-blocking units of the rotation-blocking configuration and the angular spacings between the receptacles of the receptacle configuration are selected such that the rotation-blocking configuration and the receptacle configuration are only mutually congruent in the working position.

57. The trailer hitch as in claim 1, wherein angular spacings of at least one of the rotation-blocking units in relation to the rotation-blocking units arranged in a direction of revolution around the pivot axis and in relation to the rotation-blocking units arranged adjacent and in opposition to this direction of revolution are dissimilar, and in the working position the receptacles are arranged such that the rotation-blocking bodies of each of the rotation-blocking units are configured to be brought into engagement with a respective one of the receptacles and, in all the pivotal positions of the pivot bearing body that are provided for operation and are outside the working position, including the rest position, the rotation-blocking body of at least one of the rotation-blocking units lies opposite a blocking face running between the receptacles, and, in particular if there is a force acting on the actuation body, the blocking face blocks movement of the actuation body from the release position into the rotation-blocking position.

* * * * *